(12) United States Patent
Mu et al.

(10) Patent No.: US 10,899,125 B1
(45) Date of Patent: Jan. 26, 2021

(54) PRINTING STITCHED SWATHS HAVING COMPLEMENTARY IRREGULAR BOUNDARIES

(71) Applicant: RF Printing Technologies LLC, Pittsford, NY (US)

(72) Inventors: Richard Mu, Irvine, CA (US); Yonglin Xie, Rochester, NY (US)

(73) Assignee: SHANGHAI REALFAST DIGITAL TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/710,042

(22) Filed: Dec. 11, 2019

(51) Int. Cl.
*B41J 2/045* (2006.01)

(52) U.S. Cl.
CPC ......... *B41J 2/04505* (2013.01); *B41J 2/0458* (2013.01); *B41J 2/04581* (2013.01)

(58) Field of Classification Search
CPC ... B41J 2/04505; B41J 2/0458; B41J 2/04581
See application file for complete search history.

(56) References Cited

U.S. PATENT DOCUMENTS

| | | |
|---|---|---|
| 4,748,453 A | 5/1988 | Lin et al. |
| 5,384,587 A | 1/1995 | Takagi et al. |
| 6,247,788 B1 | 6/2001 | Kamei |
| 6,375,307 B1 | 4/2002 | Vinals et al. |
| 6,832,823 B1 | 12/2004 | Askeland et al. |
| 7,118,191 B2 | 10/2006 | Fagan et al. |
| 2002/0130914 A1* | 9/2002 | Mantell ............... B41J 2/04505 347/15 |
| 2003/0132979 A1* | 7/2003 | Taylor ................. B41J 2/04586 347/19 |

* cited by examiner

Primary Examiner — Lamson D Nguyen
(74) Attorney, Agent, or Firm — Gary A. Kneezel

(57) ABSTRACT

A first swath of first dots is printed, such that each column of first dots is disposed along a first direction and is spaced apart from other columns of first dots along a scan direction. Allowable locations of first dots have an irregular extent along at least a first stitch boundary of the first swath. A second swath of second dots is printed similarly. A first stitch boundary of the second swath is proximate to the first stitch boundary of the first swath to form a first stitched region. Allowable locations of second dots have an irregular extent along at least the first stitch boundary of the second swath that is complementary to the irregular extent along the first stitch boundary of the first swath, where the allowable locations of first dots and the second dots in the first stitched region are substantially not interspersed along the first direction.

22 Claims, 25 Drawing Sheets

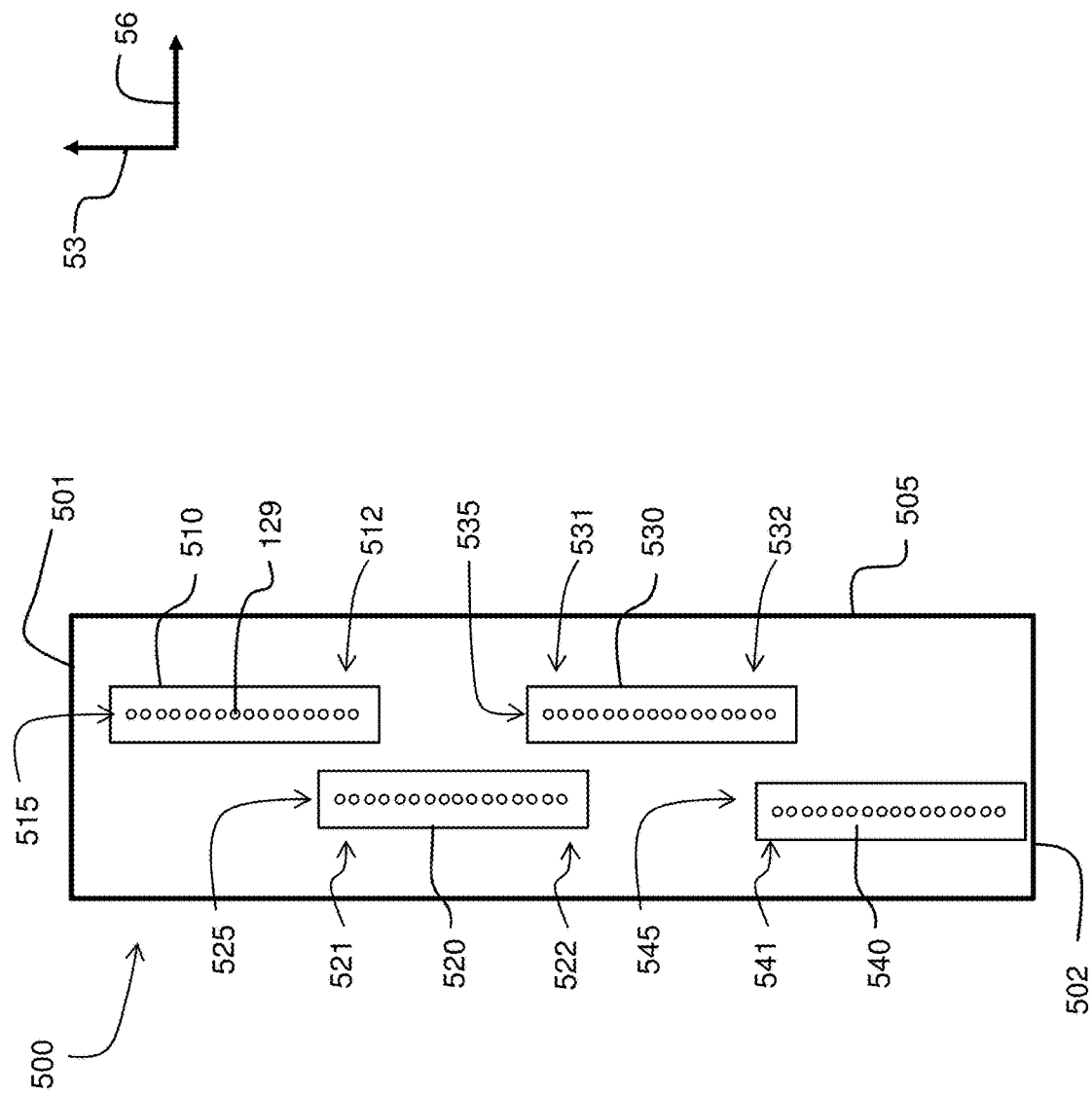
FIG. 22 – PRIOR ART

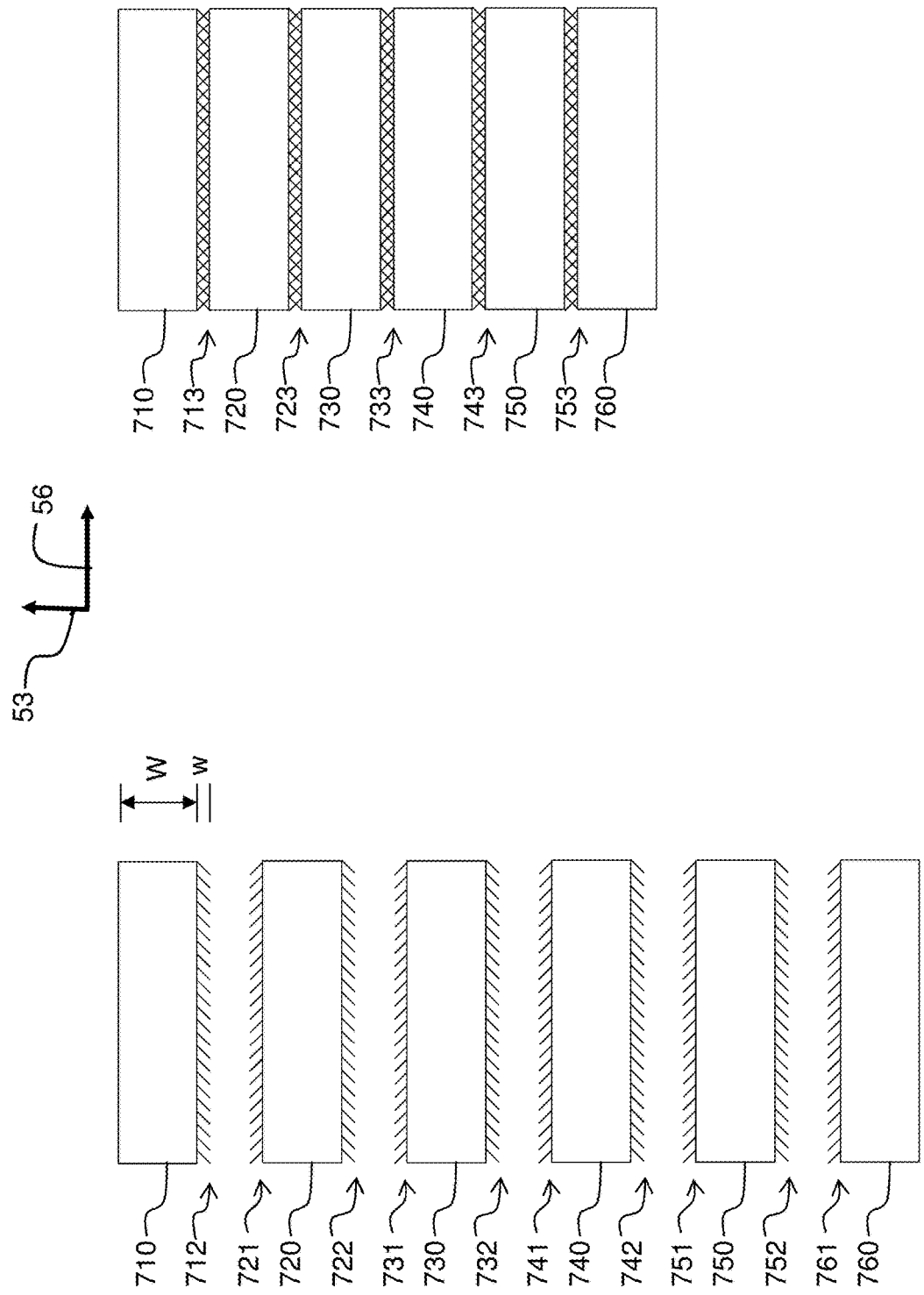

PRINTING STITCHED SWATHS HAVING COMPLEMENTARY IRREGULAR BOUNDARIES

FIELD OF THE INVENTION

This invention pertains to the field of digital printing and more particularly to forming images by printing a plurality of swaths of spots.

BACKGROUND OF THE INVENTION

Inkjet printing is typically done by either drop-on-demand or continuous inkjet printing. In drop-on-demand inkjet printing ink drops are ejected onto a recording medium using a drop ejector including a pressurization actuator (thermal or piezoelectric, for example). Selective activation of the actuator causes the formation and ejection of a flying ink drop that crosses the space between the printhead and the recording medium and strikes the recording medium. Dots are formed on the recording medium where the ink drops land. The formation of printed images is achieved by controlling the individual formation of ink drops, as is required to create the desired image.

A drop ejector in a drop-on-demand inkjet printhead includes a pressure chamber having an ink inlet for providing ink to the pressure chamber, and a nozzle for jetting drops out of the chamber. Two side-by-side drop ejectors are shown in prior art FIG. 1 (adapted from U.S. Pat. No. 7,163,278) as an example of a conventional thermal inkjet drop on demand drop ejector configuration. Partition walls 20 are formed on a base plate 10 and define pressure chambers 22. A nozzle plate 30 is formed on the partition walls 20 and includes nozzles 32, each nozzle 32 being disposed over a corresponding pressure chamber 22. Ink enters pressure chambers 22 by first going through an opening in base plate 10, or around an edge of base plate 10, and then through ink inlets 24, as indicated by the arrows in FIG. 1. A heater 35, which functions as the actuator, is formed on the surface of the base plate 10 within each pressure chamber 22 and is configured to selectively pressurize the pressure chamber 22 by rapid boiling of a portion of the ink in order to eject drops of ink through the nozzle 32.

FIG. 2 shows a prior art configuration of drop ejectors 129 disposed as a linear array 52 along an array direction 54 on a printhead 50. For simplicity, only the pressure chamber 22 and the nozzle 32 are shown for each drop ejector 129. The spacing between drop ejectors 129 in linear array 52 along array direction 54 is $D_y$. In the example of FIG. 2, there are N=32 drop ejectors 129 in linear array 52, and the center to center length L between the two endmost drop ejectors is (N−1) $D_y$. Recording medium 60 and printhead 50 are moved relative to each other along scan direction 56, and drop ejectors 129 are controllably fired to eject drops of ink toward recording medium 60. Dots are formed on recording medium 60 where ink drops land. Allowable image dot locations 66 are defined by a pixel grid 64 including pixel rows 68 and pixel columns 70. The spacing of pixel columns 70 from each other along the array direction is $D_y$, which is the same as the spacing between drop ejectors 129 in linear array 52. The spacing $D_x$ of pixel rows 68 from each other along the scan direction 56 is related to the timing of firing of drop ejectors 129, as well as the relative velocity of the printhead 50 and the recording medium 60. For recording medium 60 and printhead 50 moving at constant velocity V relative to each other along scan direction 56, $D_x = Vt = V/f$, where t is the time interval between consecutive firings of drop ejectors 129 and f is the drop ejection frequency. For many types of printheads 50, drop ejectors 129 cannot be all fired simultaneously due to excessive electrical current requirements or ink refill dynamics. In some cases, the linear array 52 is not actually a straight line. Rather the drop ejectors 129 are offset as needed in order to compensate for firing at different times so that the ink drops land along substantially straight pixel rows 68 on recording medium 60.

Motion of the recording medium relative to the printhead during drop ejection can consist of keeping the printhead stationary and advancing the recording medium past the printhead while the drops are ejected, or alternatively keeping the recording medium stationary and moving the printhead. This former architecture is appropriate if the drop ejector array on the printhead can address the entire region of interest across the width of the recording medium. Such printheads are sometimes called pagewidth printheads.

A second type of printer architecture is the carriage printer, where the printhead drop ejector array is somewhat smaller than the extent of the region of interest for printing on the recording medium and the printhead is mounted on a carriage. In a carriage printer, the recording medium is advanced a given distance along a medium advance direction (sometimes called the sub-scanning direction) and then stopped. While the recording medium is stopped, the printhead carriage is moved in a carriage scan direction (sometimes called the main scanning direction) that is substantially perpendicular to the medium advance direction as the drops are ejected from the nozzles. After the carriage has printed a swath of the image while traversing the recording medium, the recording medium is advanced; the carriage direction of motion is reversed; and the image is formed swath by swath.

FIG. 3 schematically shows an example of a carriage printing system 90 that can be used with a printhead 50 having one or more arrays of drop ejectors. In this example, the drop ejector array has a length L. A carriage (not shown) moves printhead 50 along a carriage path 91. In a first passage, the carriage moves printhead 50 in forward direction 92 as the drop ejectors print a first swath on the recording medium 60. At the end of the swath the recording medium 60 is advanced as represented by medium advance 94 along medium advance direction that is parallel to first direction 53 in this example. In a second passage the carriage moves printhead 50 in a reverse direction 93 as the drop ejectors print a second swath. In successive printing swaths the image is printed on recording medium 60. In bidirectional printing the scan direction reverses for each successive swath of printing. If the actual advance distance is substantially equal to the drop ejector array length, then there is substantially no overlap of successively printed swaths. Such printing is called single-pass printing because all dots that are printed in a particular swath region are printed in a single pass of the printhead 50 across the recording medium 60. By comparison, in two-pass printing (e.g. in the checkerboard printing disclosed in U.S. Pat. No. 4,748,453) subsequent printing swaths overlap previously printed swaths to cooperatively print the region of the image.

Single pass printing has the advantage of being comparatively fast because with no overlapping print swaths the printing of the image can be completed with fewer passages of the printhead across the recording medium. However, there are various end effects that can occur between adjacent printed swaths that can result in undesirable image defects. U.S. Pat. No. 5,384,587 discloses that when an actual medium advance distance is greater than a predetermined value, a white stripe image defect is produced, and when the actual medium advance distance is smaller than the predetermined value a black stripe image defect is produced. U.S. Pat. No. 6,247,788 discloses that unevenness in density of a recorded image can be generated due to a fluctuation in the medium advance distance. Such fluctuations can occur due to eccentricity of recording medium advance rollers, variations in thickness of the recording medium, or slippage of the recording medium, for example.

For single pass printing of successive swaths having straight edge dot boundaries, if the actual medium advance distance too large, a white line 43 will be produced between two adjacent swaths as represented in FIG. 4. In particular, first swath 40 is printed in a first passage of the printhead across the recording medium. First swath 40 includes a plurality of rows of printed dots, including first end row 41 and second end row 42. The recording medium is advanced and then the second swath 45 is printed, including first end row 46 and second end row 47. For an ideal advance distance of the recording medium (equivalent to $ND_y$ in the example shown in FIG. 2), the joint between the first swath 40 and the second swath 45 will not be visible, because the distance between second end row 42 of the first swath 40 and the first end row 46 of the second swath 45 will be the same as the distance between each of the rows within first swath 40 and second swath 45. If for the linear array 52 of drop ejectors shown in FIG. 2, the medium advance is greater than $ND_y$ and if the error is sufficiently large, the white line 43 between the first swath 40 and the second swath 45 will result in objectionable image quality.

Similarly, if the actual medium advance distance is too small, a dark line 48 will be produced between the first swath 40 and the second swath 45 due to the partial overlap of the second end row 42 of the first swath 40 and the first end row 46 of the second swath 45 as represented in FIG. 5.

U.S. Pat. No. 5,384,587 discloses a printing method for reducing the extent of white stripe banding and black stripe banding in images. In a first illustrative example, a printhead has 128 sequentially numbered drop ejectors with drop ejector number 1 at one end and drop ejector number 128 at the other end. The nominal medium advance distance between successive swaths in this example is 125 nozzle pitch distances so that the positions of drop ejectors 1, 2 and 3 in a first printhead passage overlap the positions of drop ejectors 126, 127 and 128 respectively in a second printhead passage. The total number of ink droplets printed in the overlap region is gradually decreased toward the endmost drop ejectors. For example, in a row of pixels drop ejector 1 prints 25% of the ink drops in a first swath and drop ejector 126 prints 75% of the ink drops in that same row of pixels in the second swath. In an adjacent row of pixels, drop ejector 2 prints 50% of the ink drops in the first swath and drop ejector 127 prints 50% of the ink drops in the second swath. In a next adjacent row of pixels, drop ejector 3 prints 75% of the ink drops in the first swath and drop ejector 128 prints 25% of the ink drops in the second swath. The details of the configuration of the pixels printed in the overlap region in the first swath and the second swath are not disclosed in '587.

U.S. Pat. No. 6,375,307 discloses a similar printing method in which successive print swaths overlap by typically one eighth of their width at each edge, each edge region of each swath having a reduced print density so that the combined density of the overlapping regions matches or exceeds that of the non-overlapping regions. In a first embodiment, each edge region is printed with 50% printing density so that the combined density in the overlapping region is 100%. In other embodiments the printing mask is modified so that each edge region includes two or more sub-regions such that the sub-regions printed by the outermost drop ejectors are printed with a lower printing density. Such overlap of the edge regions is said to help decrease the visibility of image defects associated with misdirected ink drops from drop ejectors toward the ends of the arrays. Since the largest portion of the swaths is not overlapped (i.e. printed in single pass printing mode) the overall decrease in printing throughput is moderate. The details of the configuration of the pixels printed in the overlap region of successive swaths are not disclosed in '307.

U.S. Pat. No. 6,832,823 discloses an inkjet printhead having at least two substrates each with both overlapping and non-overlapping nozzle rows. A method of printing with such a printhead is disclosed in which at least one ink ejection element associated with at least one nozzle in the overlapping nozzle rows is selectively disabled based on a swath height error (associated with erroneous dot placement) of the substrate. The details of the configuration of the pixels printed in the overlap region printed by the overlapping nozzle rows are not disclosed in '823.

U.S. Pat. No. 6,247,788 discloses reducing image density unevenness due to medium advance fluctuations by interlace printing in which a part of an area printed during the nth carriage scan is overlapped with a part of an area recorded by the (n+k)th carriage scan where n is an integer greater than or equal to 1 and k is an integer greater than or equal to 2. FIGS. 10A, 11A, 12A and 23 of '788 all show interlacing of overlapping swath regions, where there is interlacing of dots printed during different swaths both along the carriage scan direction and the sub-scanning direction (i.e. the medium advance direction).

U.S. Pat. No. 7,118,191 discloses printing in a series of carriage scan passes where different addressing patterns are selected in each scanning pass to address ink drop locations for different portions of the raster lines addressed by each carriage scan pass. Addressing patterns having various interlacing percentages are selected in order to produce overlapping boundary regions to reduce the banding effects that occur with inexact ink drop placement. For example, checkerboard interlacing similar to that disclosed in U.S. Pat. No. 4,748,453 is shown in FIGS. 3(a) to 3(d) of '191. In subsequent figures, different addressing patterns for each pass (variable interlacing) are shown for different embodiments. In all of the overlapping swath pixel configurations that are shown in '191 there is interlacing of dots printed during different swaths both along the carriage scan direction and the medium advance direction.

It has been found that objectionable image artifacts due to inaccurate medium advance are not overcome satisfactorily by overlapping different swaths in an interface region where dots printed during different swaths are interlaced along both the carriage scan direction and the medium advance direction. This is illustrated in prior art dot configuration shown in FIGS. 6 to 10. FIG. 6 shows a swath 210 having an interface region 215 including four rows 211, 212, 213 and 214, and also a swath 220 having an interface region 225 including four rows 221, 222, 223 and 224. The distance between adjacent rows of dots in swath 210 and in swath 220 is d. For clarity swaths 210 and 220 are separated in FIG. 6 so that the respective dots in the different swaths can be distinguished. The black dots in each swath represent allowable printing dot locations for that swath. If the image data corresponded to solid area printing, each swath 210 and 220 would print all of the dots shown in FIG. 6. Allowable dot locations in row 211 are complementary with allowable dot locations in row 221. Similarly, allowable dot locations in rows 212 and 222 are complementary, as are allowable dot locations in rows 213 and 223 and in rows 214 and 224. Swath 210 can be printed as a carriage is scanned along carriage scan direction 56. Then the recording medium is advanced along first direction 53, followed by the printing of swath 220 as the carriage is scanned along carriage scan direction 56 (or in the reverse direction in the case of bidirectional printing). The configuration of allowable dot locations in interface regions 215 and 225 is characterized by dots in interface region 215 being interlaced with dots in interface region 225 both along the carriage scan direction 56 and the first direction 53. An example of dots being interlaced along the carriage scan direction 56 is that each row in the interface regions 215/225 is printed by complementary rows from swath 210 and 220, such as rows 211 and 221. An example of dots being interlaced along the first direction 53 is that in dot column 201, dots are printed in swath 210 in rows 212 and 214 but not in rows 211 and 213. The missing dots are printed subsequently in dot column 201 in rows 221 and 223 of swath 220. Similarly, dots in dot column 202 are printed in swath 210 in rows 211, 213 and 214 but not in row 212. The missing dot is printed subsequently in dot column 202 in row 222 of swath 220.

In the example shown in FIG. 6, swath 210 has a total of 16 rows of dots, including the four rows 211, 212, 213 and 214 that are intended to overlap with complementary rows of dots in swath 220, plus 12 other rows of dots that are not intended to overlap with swath 220. An ideal medium advance distance in this example between printing swath 210 and swath 220 is D=12d. FIG. 7 shows the resulting dot pattern after printing swaths 210 and 220 with the ideal medium advance distance D. There are 28 rows of dots including the top twelve rows printed in swath 210, the bottom 12 rows printed in swath 220, and the middle 4 rows in the overlapping interface region 215 and 225 that are printed cooperatively in swaths 210 and 220.

FIG. 8 shows the objectionable image quality in the overlapping interface regions 215 and 225 that results if the medium advance distance is half a row spacing distance d too large, i.e. 12.5d in this example. The visual defect is a light colored band in the overlapping interface region. The error is distributed over four rows of dots and may be less discernable than the white line 43 shown in FIG. 4, but it is still objectionable.

FIG. 9 shows the objectionable image quality in the overlapping interface regions 215 and 225 that results if the medium advance distance is half a row spacing distance d too small, i.e. 11.5d in this example. The visual defect is a noisy band in the overlapping interface region with both light colored and dark colored areas. It may be less discernable than the defect caused by half a row spacing too large of a medium advance distance shown in FIG. 8, but it is still objectionable.

FIG. 10 shows the objectionable image quality in the overlapping interface regions 215 and 225 that results if the medium advance distance is one row spacing distance d too small, i.e. 11d in this example. In the overlapping interface region, instead of row 211 of swath 210 aligning with row 221 of swath 220, it aligns with row 222 of swath 220. The overlapping interface regions 215 and 225 are three rows wide instead of four rows wide. Some dots land on top of other dots, and other pixels remain white.

Despite the previous advances in overlapping swath configurations to disguise the effects of errors in recording medium advance, what is still needed are swath configurations and printing methods, as well as printing system designs, that reduce the visibility of printing defects resulting from errors in recording medium advance.

SUMMARY OF THE INVENTION

According to an aspect of the present invention, a method of printing stitched swaths having complementary irregular boundaries is set forth. The method includes providing a printhead having at least one array of dot forming elements, and moving the printhead relative to a recording medium along a scan direction. A first swath of first dots is printed by printing a first series of print strokes, such that the first dots printed by each print stroke are disposed along a first direction in a corresponding column of first dots such that each column of first dots is spaced apart from other columns of first dots along the scan direction. Allowable locations of the first dots have an irregular extent along at least a first stitch boundary of the first swath. A second swath of second dots is printed by printing a second series of print strokes, such that the second dots printed by each print stroke are disposed along the first direction in a corresponding column of second dots such that each column of second dots is spaced apart from other columns of second dots along the scan direction. A first stitch boundary of the second swath is proximate to the first stitch boundary of the first swath to form a first stitched region. Allowable locations of second dots have an irregular extent along at least the first stitch boundary of the second swath that is complementary to the irregular extent along the first stitch boundary of the first swath, where the allowable locations of the first dots and the allowable locations of the second dots in the first stitched region are substantially not interspersed along the first direction.

According to another aspect of the present invention, an inkjet printing system includes a printhead, an ink source, a transport mechanism, an image data source, an electrical pulse source and a controller. The printhead includes at least one array of drop ejectors. The ink source is connected to the at least one array of drop ejectors. The transport mechanism is configured to move the printhead relative to a recording medium along a scan direction. The image data source is configured to provide image data signals corresponding to an image to be printed. The electrical pulse source is configured to send pulse waveforms to the printhead. The controller is configured to receive the image data signals and to send output signals to the electrical pulse source for controlling the firing of the drop ejectors in order to print the image. A set of print masks is provided to the controller for specifying at least which drop ejectors of a printhead are responsible for printing dots according to the image data in a stitched region having a height of K raster lines. The set of print masks includes at least: a first print mask including first stitch mask data arranged as K rows corresponding to the K raster lines in the stitched region, and m columns corresponding to columns of dot locations along a first direction in the first swath, such that for each column j from 1 to m, the first stitch mask data consists substantially of all ones from the first non-zero data element of the stitched region through row k(j) of the stitched region, and such that the first stitch mask data consists substantially of all zeroes for row (k(j)+1) through row K; and a second print mask including second stitch mask data arranged as K rows corresponding to the K raster lines in the stitched region, and m columns corresponding to columns of dot locations along the first direction in the second swath, such that the second stitch mask data is complementary to the first stitch mask data.

This invention has the advantage that image quality defects due to recording medium advance errors in a carriage printer are made to be less visibly discernible.

It has the additional advantage that image quality defects due to alignment errors of overlapping arrays of dot forming elements are made to be less visibly discernible.

BRIEF DESCRIPTION OF THE DRAWINGS

FIG. 22 shows a prior art type of printhead that can be used in other embodiments;

FIGS. 25A and 25B show a schematic representation of single-pass printing according to an embodiment.

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 11:
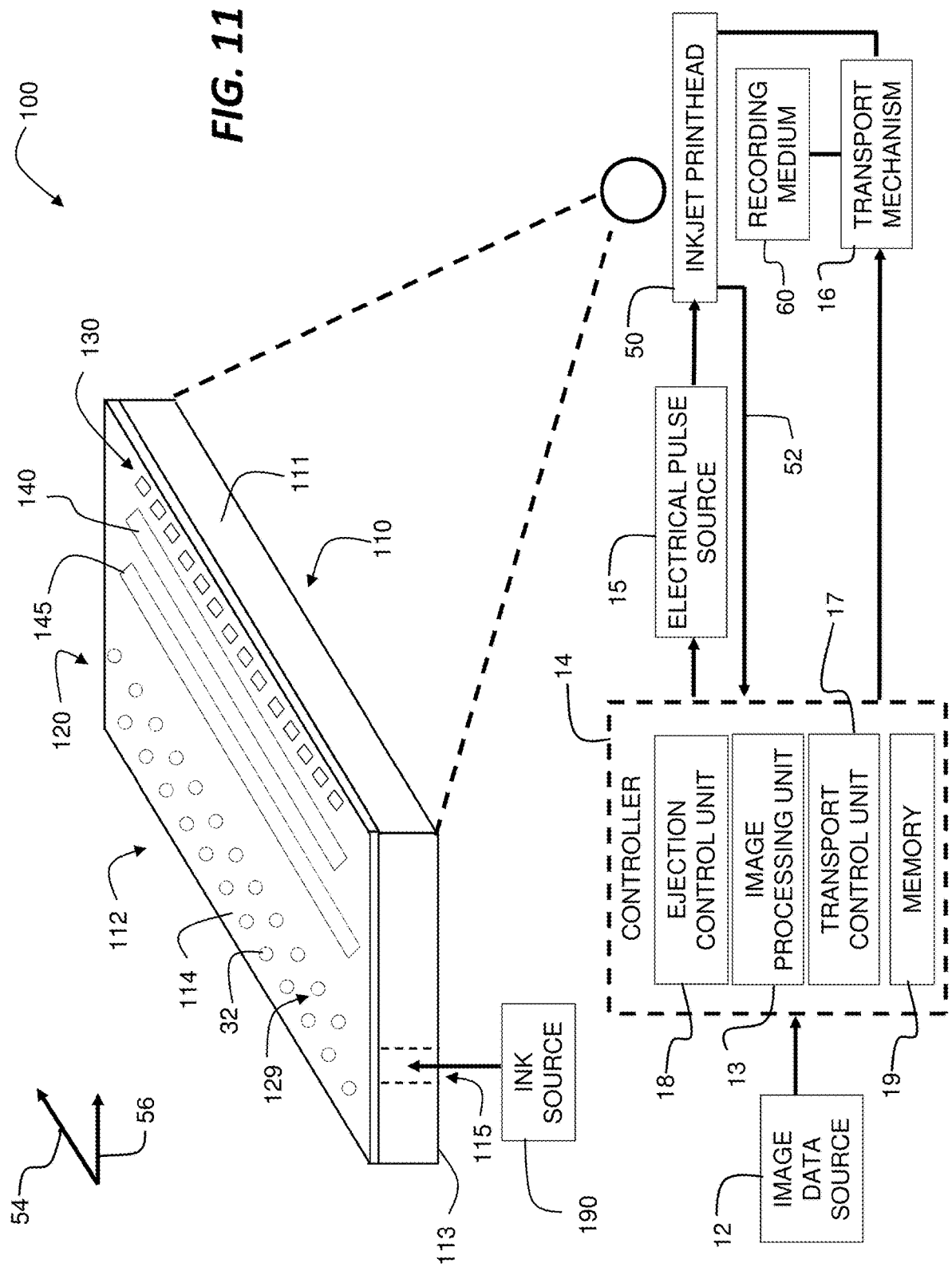
FIG. 11 is a schematic representation of an inkjet printing system that can be used in an embodiment.

FIG. 11 shows a schematic representation of an inkjet printing system 100 together with a perspective of drop ejector array device 110. Image data source 12 provides image data signals that are interpreted by a controller 14 as commands for ejecting drops. Controller 14 includes an image processing unit 13 for rendering images for printing. The term "image" is meant herein to include any pattern of dots directed by the image data. It can include graphic or text images. It can also include patterns of dots for printing functional devices or three dimensional structures if appropriate inks are used. Controller 14 includes memory 19 that can include print masks for specifying allowable printed dot locations in various swaths. Controller 14 also includes a transport control unit 17 for controlling transport mechanism 16 and an ejection control unit 18 for ejecting ink drops to print a pattern of dots corresponding to the image data onto the recording medium 60. Controller 14 sends output signals to an electrical pulse source 15 for sending electrical pulse waveforms to an inkjet printhead 50 that includes at least one drop ejector array device 110. Sending the electrical pulse waveforms to the inkjet printhead 50 is also referred to herein as sending print data to the printhead. A printhead output line 52 is provided for sending electrical signals from the printhead 50 to the controller 14 or to sections of the controller 14, such as the ejection control unit 18. For example, printhead output line 52 can carry a temperature measurement signal from printhead 50 to controller 14. Transport mechanism 16 provides relative motion between inkjet printhead 50 and recording medium 60 along a scan direction 56. Transport mechanism 16 is configured to move the recording medium 60 along scan direction 56 while the printhead 50 is stationary in some embodiments. Alternatively, transport mechanism 16 can move the printhead 50, for example on a carriage, past stationary recording medium 60. Various types of recording media for inkjet printing include paper, plastic, and textiles. In a 3D inkjet printer, the recording media include a flat building platform and a thin layer of powder material. In addition, in various embodiments recording medium 60 can be web fed from a roll or sheet fed from an input tray.

Drop ejector array device 110 includes at least one drop ejector array 120 having a plurality of drop ejectors 129 formed on a top surface 112 of a substrate 111 that can be made of silicon or other appropriate material. Typically one or more thin film layers are deposited and patterned on the substrate 111 to form the drop ejectors and associated electronics. When it is said herein that the drop ejectors 129 or circuitry components are formed on the top surface 112, it is meant to include being formed on or in one or more of these thin film layers. In the example shown in FIG. 11, drop ejector array 120 includes a pair of rows of drop ejectors 129 that extend along array direction 54 and that are staggered with respect to each other in order to provide increased printing resolution.

Ink is provided to drop ejectors 129 by ink source 190 through ink feed 115 which extends from the back surface 113 of substrate 111 toward the top surface 112. Ink source 190 is generically understood herein to include any substance that can be ejected from an inkjet printhead drop ejector. Ink source 190 can include colored ink such as cyan, magenta, yellow or black. Alternatively ink source 190 can include conductive material, dielectric material, magnetic material, or semiconductor material for functional printing. Ink source 190 can alternatively include biological or other materials.

Figure 1:
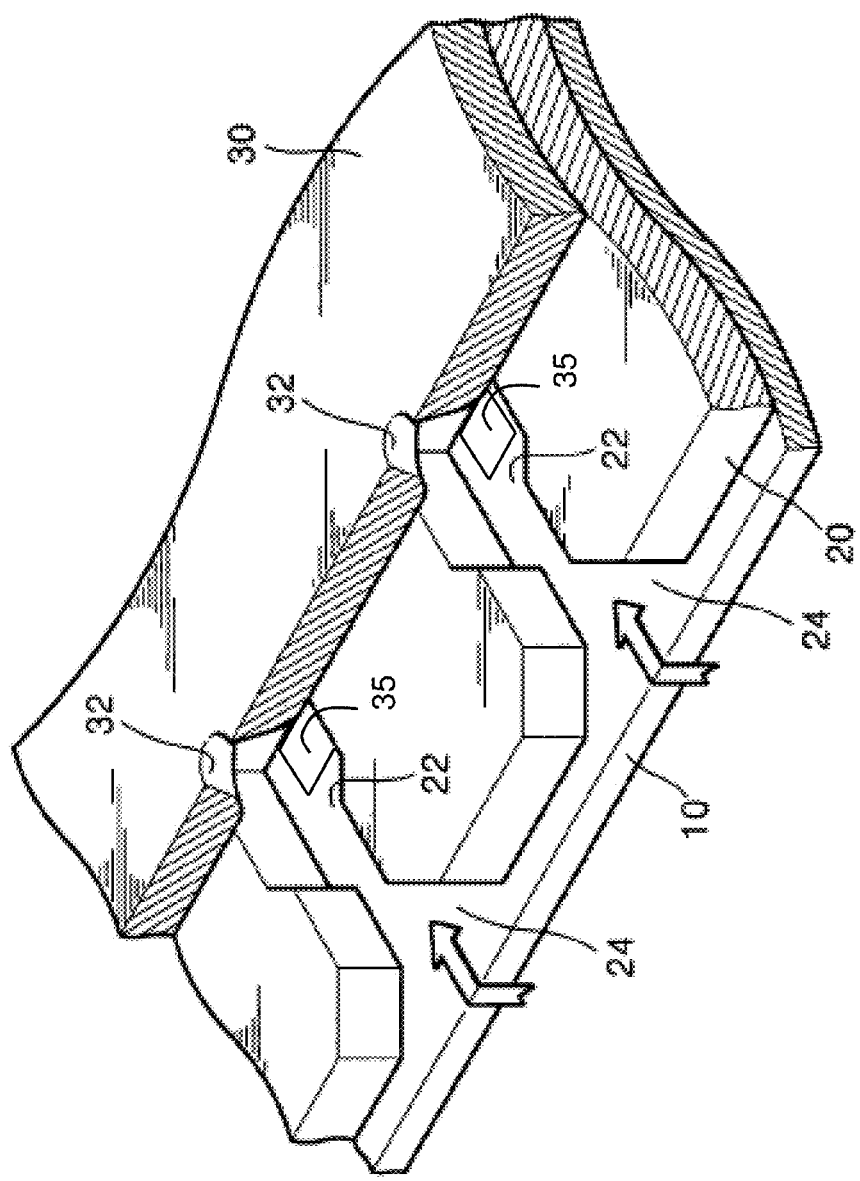
FIG. 1 shows a perspective of a prior art drop ejector configuration.
Figure 2:
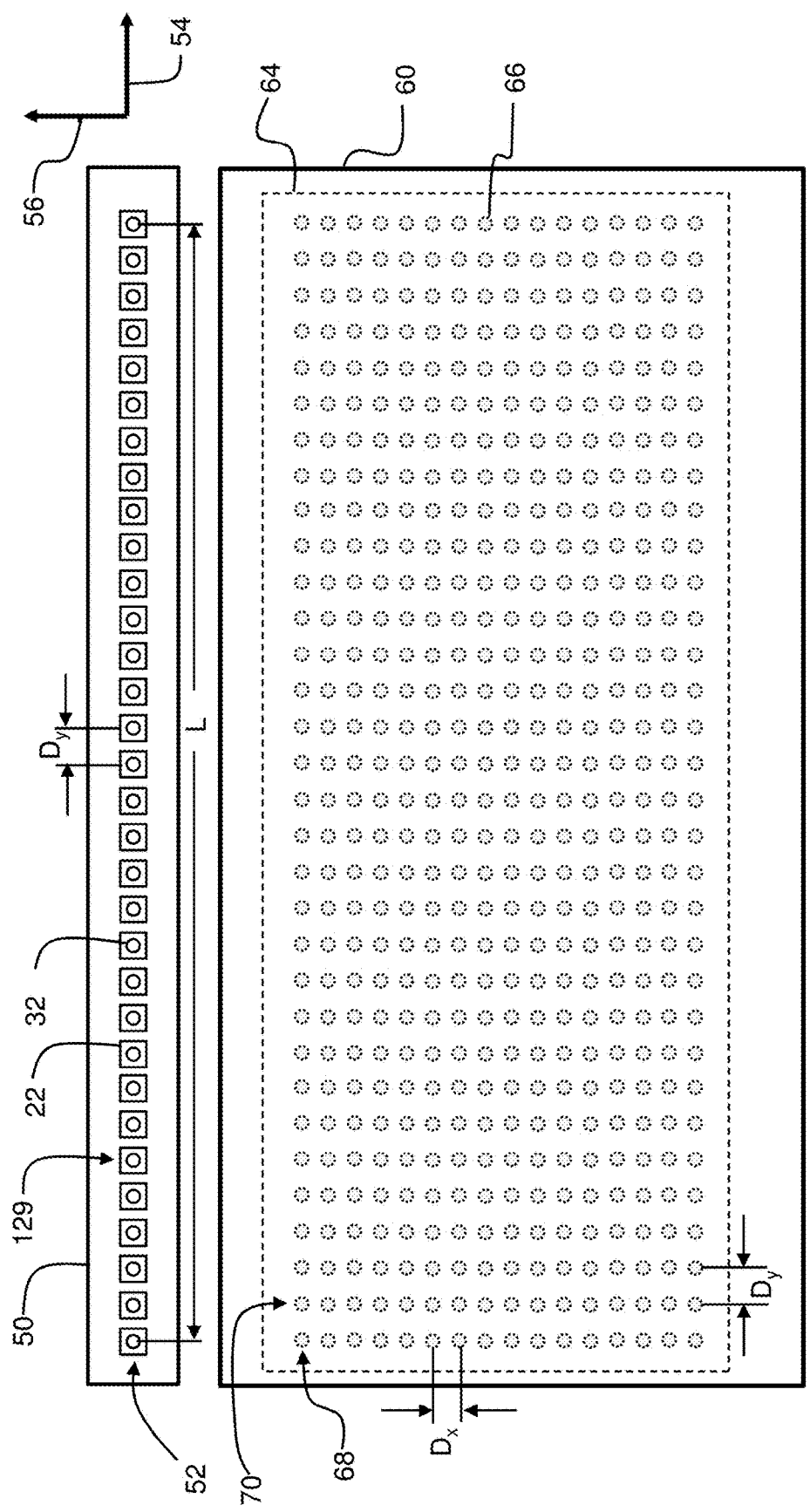
FIG. 2 shows a prior art printhead including a linear array of drop ejectors and also a recording medium with a pixel grid of allowable dot locations.

For simplicity, location of the drop ejectors 129 is represented by the circular nozzle 32. Nozzle face 114 is the exterior surface through which the nozzles 32 extend. Not shown in FIG. 11 are the pressure chamber 22, the ink inlet 24, or the actuator 35 (FIG. 1). Ink inlet 24 is configured to be in fluidic communication with ink source 190. The pressure chamber 22 is in fluidic communication with the nozzle 32 and the ink inlet 24. The actuator 35, e.g. a heating element or a piezoelectric element, is configured to selectively pressurize the pressure chamber 22 for ejecting ink through the nozzle 32.

Drop ejector array device 110 includes a group of input/output pads 130 for sending signals to and sending signals from drop ejector array module 110 respectively. Also provided on drop ejector array device 110 are logic circuitry 140 and driver circuitry 145. Logic circuitry 140 processes signals from controller 14 and electrical pulse source 15 and provides appropriate pulse waveforms at the proper times to driver circuitry 145 for actuating the drop ejectors 129 of drop ejector array 120 in order to print an image corresponding to data from image processing unit 13. When it is said herein that lines or circuit components are connected to drop ejectors, it is meant that they are connected to the actuators of the drop ejectors. Logic circuitry 140 sequentially selects one or more drop ejectors in the drop ejector array to be actuated. Different groupings of drop ejectors 129 in the drop ejector array are fired sequentially so that the capacities of the electrical pulse source 15 and the associated power leads are not exceeded. A grouping of drop ejectors 129 is fired during a print cycle. A stroke is defined as a plurality of sequential print cycles, such that during a stroke all of the drop ejectors 129 of drop ejector array 120 are addressed once so that they have opportunity to be fired once based upon the image data. Logic circuitry 140 can include circuit elements such as shift registers, gates and latches that are associated with inputs for functions including providing data, timing, and resets.

Figure 12:
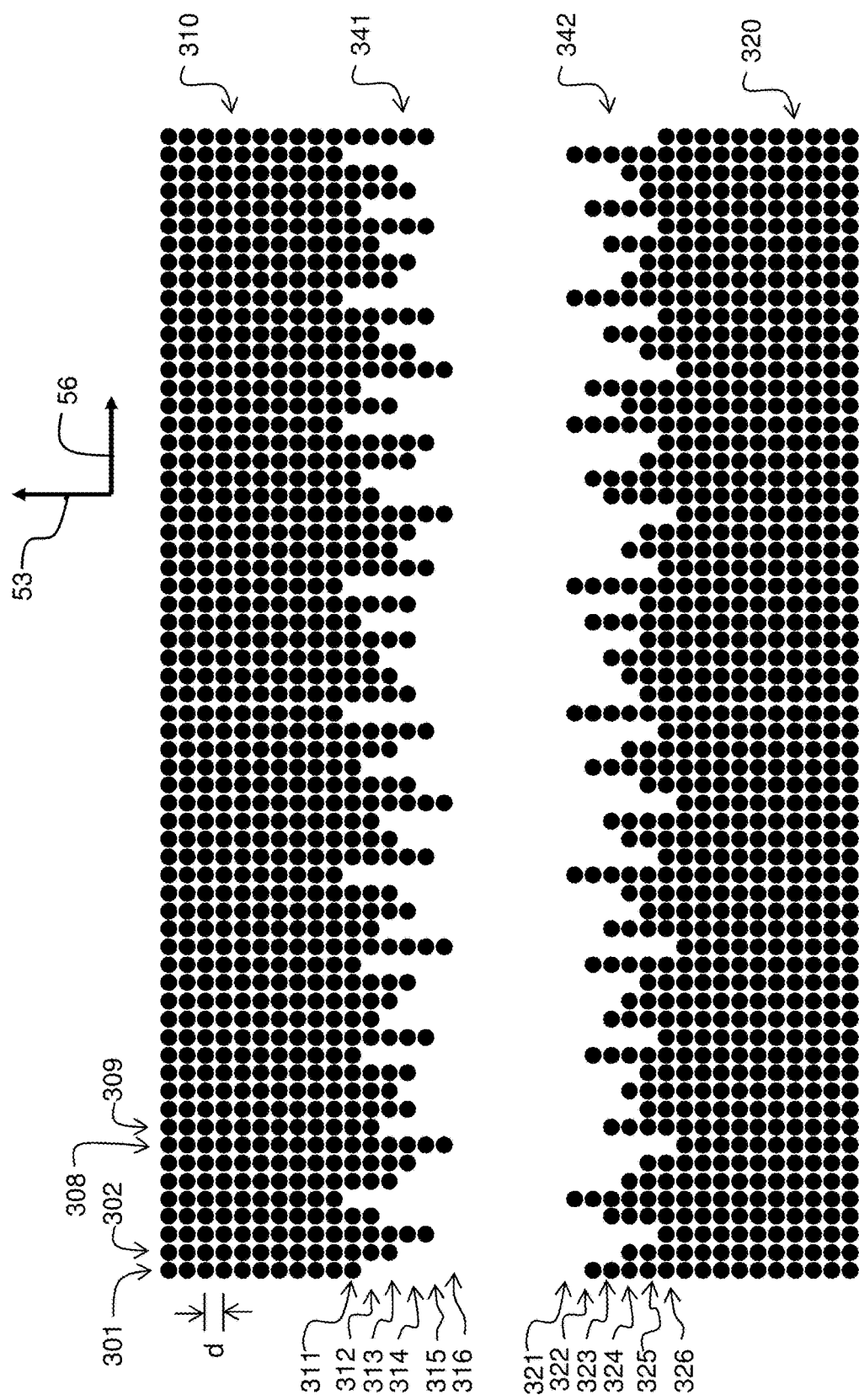
FIG. 12 shows a pair of swaths of dots having stitch boundaries with dot configurations having allowable dot locations according to an embodiment.

FIG. 12 shows a first swath 310 of allowable first dot locations and a second swath 320 of allowable second dot locations that are configured according to an embodiment of the present invention. Dots that are actually printed depend on allowable dot locations as well as on the image data. The black dots in each dot column (e.g. dot columns 301 and 302) of first swath 310 represent allowable dot locations that can be printed by printing a first series of print strokes, the dots of each print stroke being disposed along a first direction (parallel to the medium advance direction 53 for the case of printing with a carriage printer). In other words, dots in dot column 301 are printed by one print stroke and dots in dot column 302 are printed by a different print stroke. Dots of each print stroke are spaced apart from dots of other print strokes of the first series along the scan direction 56. In many embodiments, the first direction 53 (e.g. parallel to the medium advance direction) is perpendicular to the scan direction 56. Allowable dot locations of the first swath 310 have an irregular extent along a first stitch boundary 341. First stitch boundary 341 includes dots in rows 311, 312, 313, 314, 315 and 316 of first swath 310. First swath 310 includes a total of 16 rows in this example, including the six rows 311-316 that are part of the first stitch boundary 341 and ten other rows at the top of first swath 310. The extent of allowable dot locations in dot column 301 (printed by a first stroke in first swath 310) along first stitch boundary 341 is one dot long. In other words there is an allowable dot in row 311 in dot column 301 of first stitch boundary 341 of first swath 310, but there are no allowable dots in rows 312-316 of the first stitch boundary 341. The extent of allowable dot locations in dot column 302 (printed by a second stroke in first swath 310) is three dots long. In other words there are allowable dots in rows 311-313 in dot column 301 of first stitch boundary 341 of first swath 310, but there are no allowable dots in rows 314-316 of the first stitch boundary 341. The extent of allowable dot locations in the remaining dot columns (not labeled) in first swath 310 ranges from one dot long to six dots long along first stitch boundary 341.

For the sake of brevity in the descriptions below relative to FIG. 12 and similar figures the "allowable dot locations" will be referred to interchangeably as "dots".

The dots in each dot column (e.g. dot columns 301 and 302) of second swath 320 can be printed by printing a second series of print strokes, the dots of each print stroke being disposed along a first direction 53 (medium advance direction). In the case of bidirectional carriage printing, if dots in dot column 301 were printed before dots in adjacent dot column 302 for first swath 310, then dots in dot column 301 are printed after dots in adjacent dot column 302 for second swath 320. Dots for the print strokes for the second swath have an irregular extent along a first stitch boundary 342 of the second swath 320. First stitch boundary 342 includes dot locations in rows 321, 322, 323, 324, 325 and 326 of second swath 320. Second swath 320 includes a total of 16 rows in this example, including the six rows 321-326 that are part of the second stitch boundary 342 and ten other rows at the bottom of second swath 320. The irregular extent of dots along the first stitch boundary 342 of second swath 320 is complementary to the irregular extent of dots along the first stitch boundary 341 of first swath 310 so that in each dot column the sum of the dots in the first stitch boundary 341 and the second stitch boundary 342 is six, corresponding to the number of rows in first stitch boundary 341 and second stitch boundary 342. For example, in dot column 301, one dot is printed in row 311 of first swath 310 and five dots are printed in rows 322-326 of second swath 320. In dot column 302, three dots are printed in rows 311-313 of first swath 310 and three dots are printed in rows 324-326 of second swath 320. During printing of an image, first stitch boundary 342 of second swath 320 is proximate to first stitch boundary 341 of first swath 310 to form a first stitched region 350 as shown in FIGS. 13-16.

Figure 6:
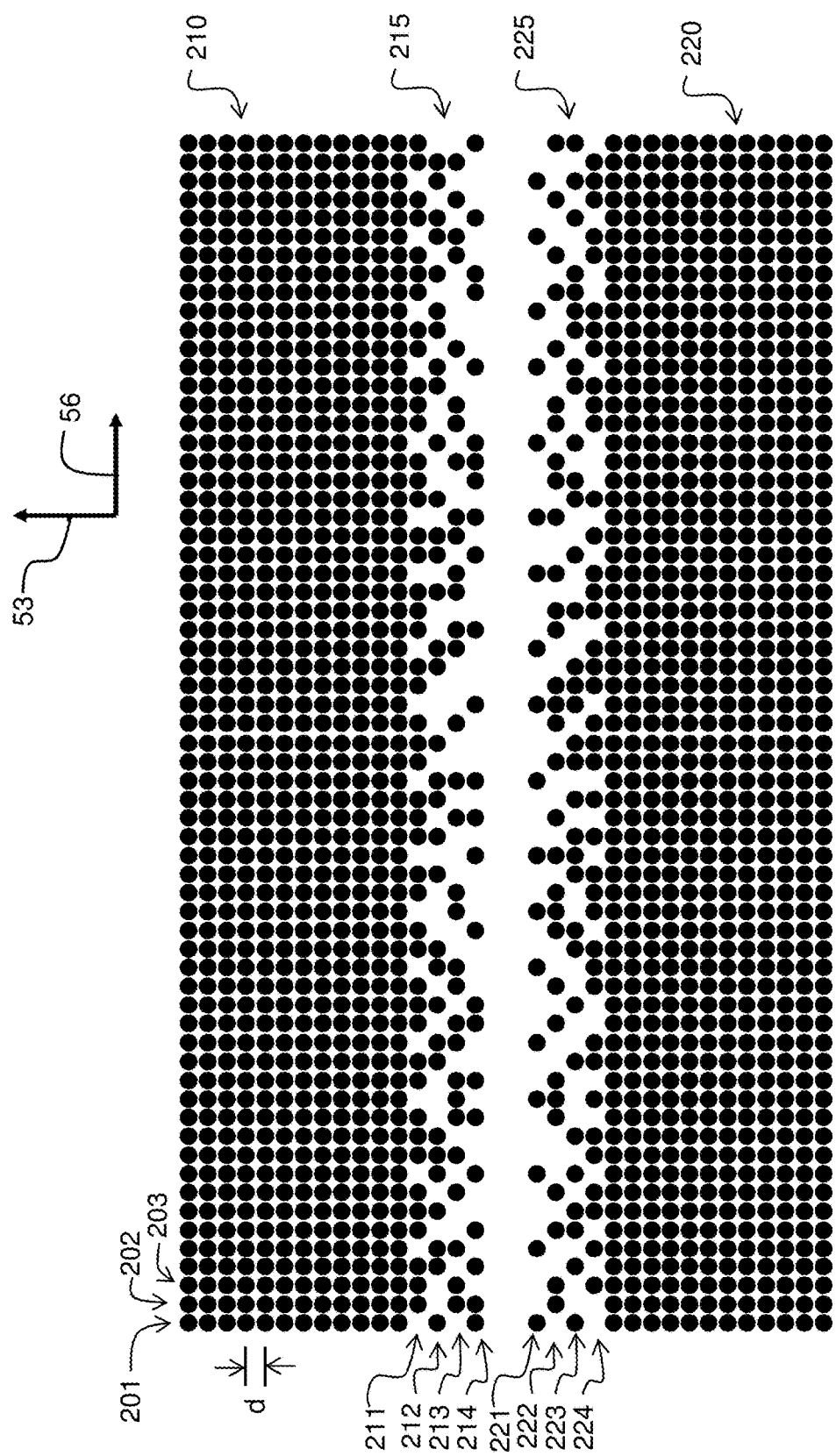
FIG. 6 shows a pair of swaths of dots having interface regions with dot configurations having prior art allowable dot locations.
Figure 8:
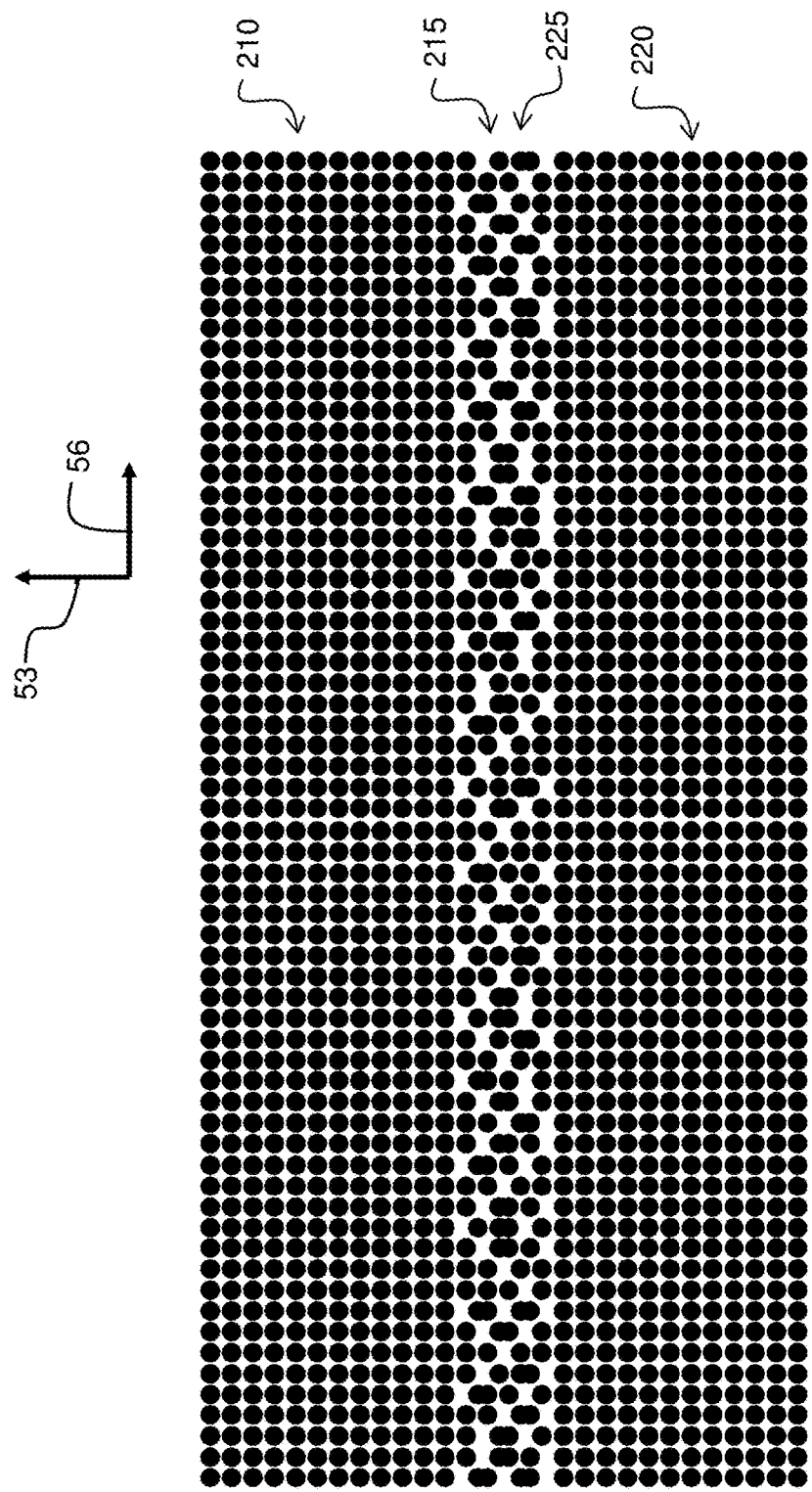
FIG. 8 shows the resulting image defect resulting from a recording medium advance distance between the FIG. 6 pair of swaths that is half a pixel row spacing too large.
Figure 9:
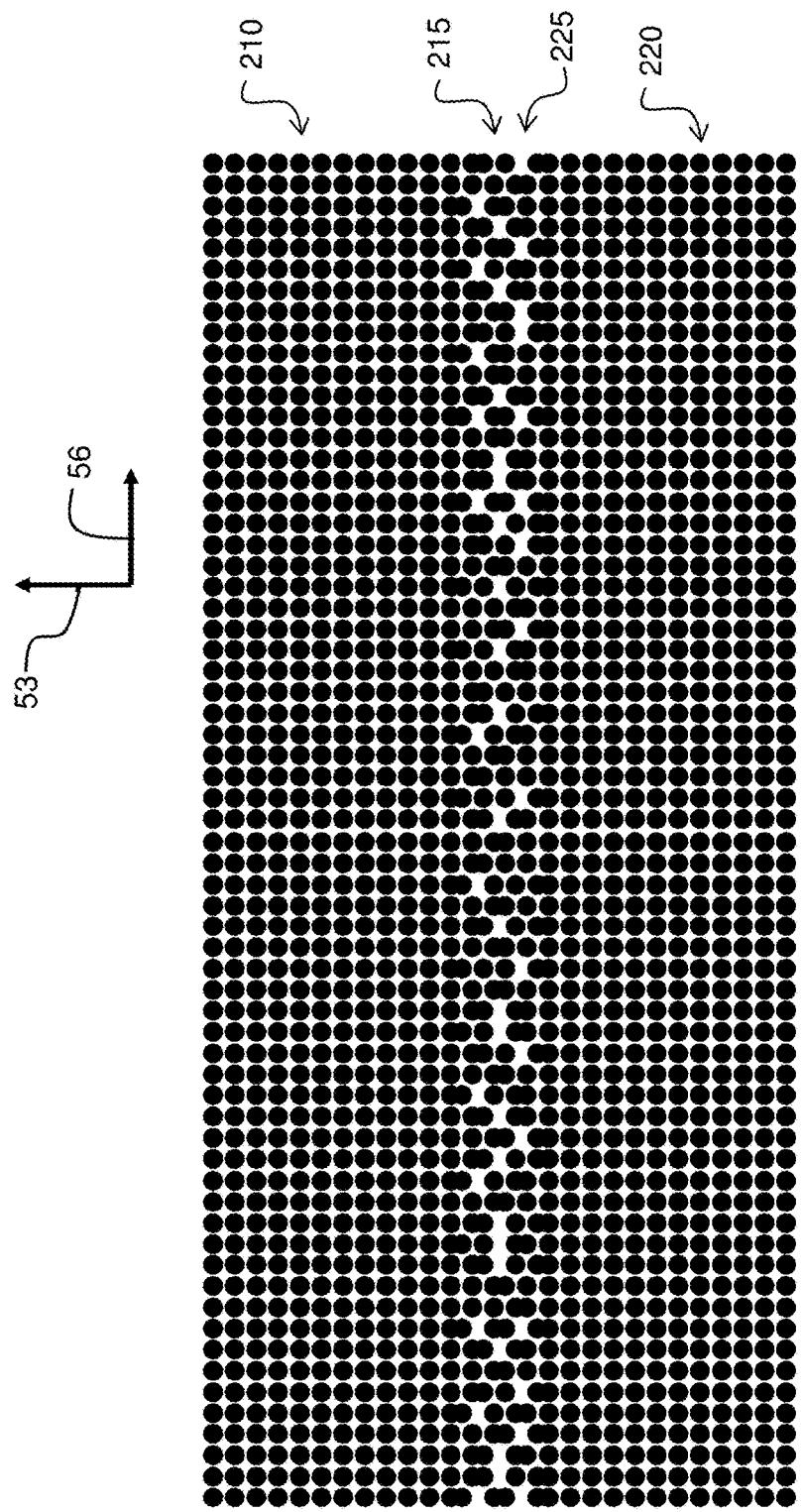
FIG. 9 shows the resulting image defect resulting from a recording medium advance distance between the FIG. 6 pair of swaths that is half a pixel row spacing too small.
Figure 10:
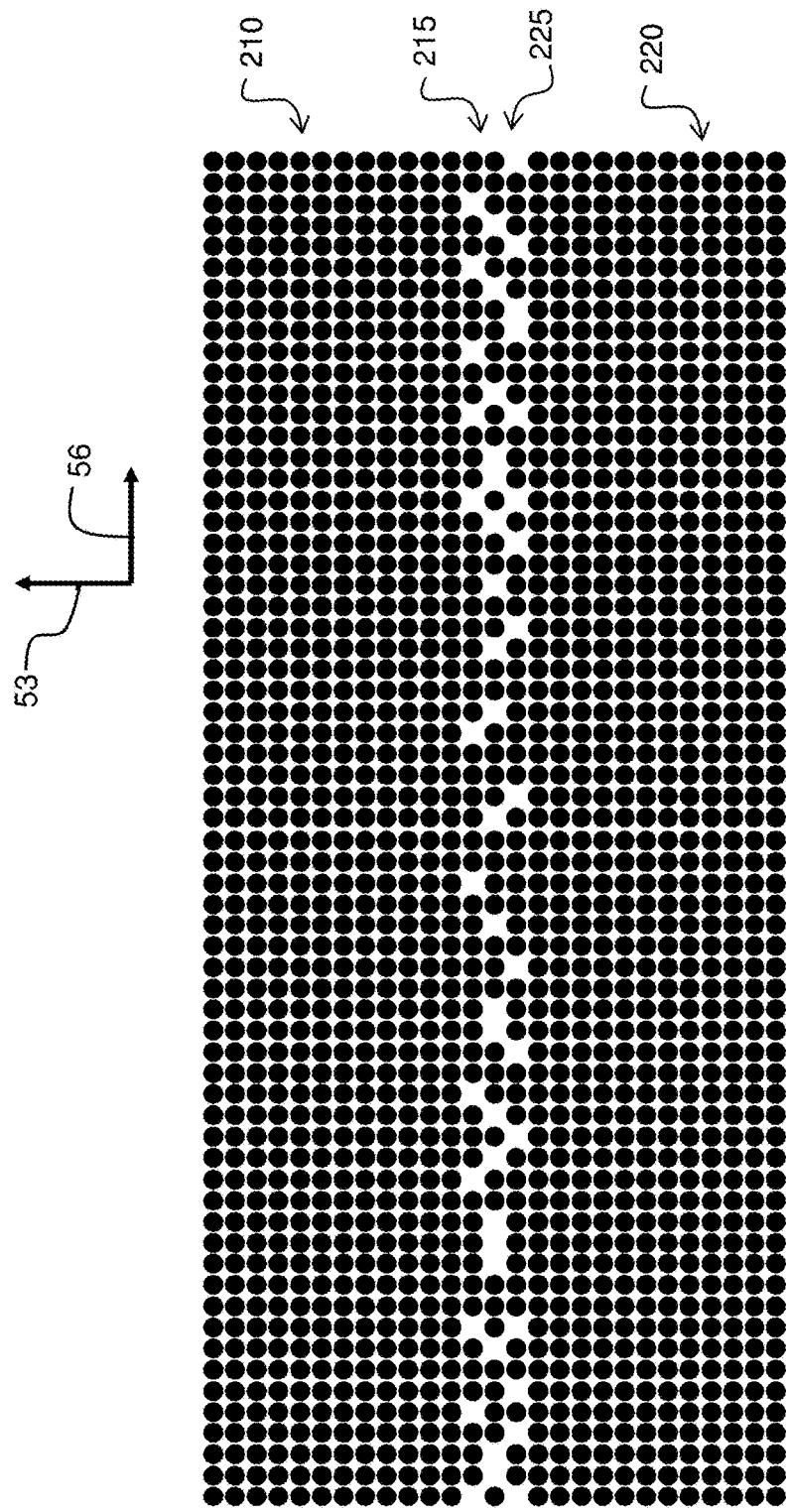
FIG. 10 shows the resulting image defect resulting from a recording medium advance distance between the FIG. 6 pair of swaths that is one pixel row spacing too large.

Unlike the prior art configuration of dots shown in FIG. 6, in the preferred embodiment illustrated in FIG. 12 there is no interspersing of the first dots from rows 311 to 316 of first swath 310 and the second dots from rows 321 to 326 of second swath 320 along first direction 53 in the first stitched region 350. In other words, there are no missing dots in a dot column in the first stitch boundary 341 of first swath 310 until the extent of dots in that that column ends in the first stitch boundary 341, e.g. until row 312 in dot column 301 or until row 314 in dot column 302, and in complementary fashion in the second stitch boundary 342 in second swath 320. By comparison in FIG. 6 there are two missing dots (row 211 and row 213) between the last continuous string of dots in dot column 201 of first swath 210 and the last dot in row 214. In dot column 202 there is one missing dot (row 212) between the last continuous string of dots (ending at row 211) and the last dot in row 214. In dot column 203 there is one missing dot (row 212) between the last continuous string of dots (ending at row 211) at the last dot in row 213. There are 64 dot columns in swath 210 and four rows (211 to 214) in interface region 215 of first swath 210 for a total of 256 dot positions in the interface region. In this example of a prior art dot configuration, the total number of missing dots between the last continuous string of dots in a column and the last printed dot in the corresponding column is 61. The percentage of missing dots between the last continuous string of dots and the last dots in all the columns of interface region 215 of first swath 210 in FIG. 6 is about 24%. Because rows 221 to 224 of second swath 220 are complementary to rows 211 to 214 of first swath 210 that means that about 24% of the dots printed in interface region 215/225 in FIG. 6 are interspersed along the first direction 53 between first swath 210 and second swath 220. Such a large percentage (or even larger) of dots interspersed within the interface region of a swath along the medium advance direction (first direction 53) is typical of prior art configurations. To reduce the types of print defects seen in FIGS. 8 to 10 it is desirable to have a much lower percentage of dots interspersed along the first direction 53 of the interface region. In embodiments of the present invention it is said that the allowable locations of first dots of the first swath and the allowable locations of second dots of the second swath in the first stitched region are substantially not interspersed in the first direction 53 if fewer than 5%, preferably if fewer than 3%, more preferably if fewer than 1% and most preferably 0% of the allowable first dot locations and the allowable second dot locations are interspersed in the first stitched region in the first direction 53.

Figure 7:
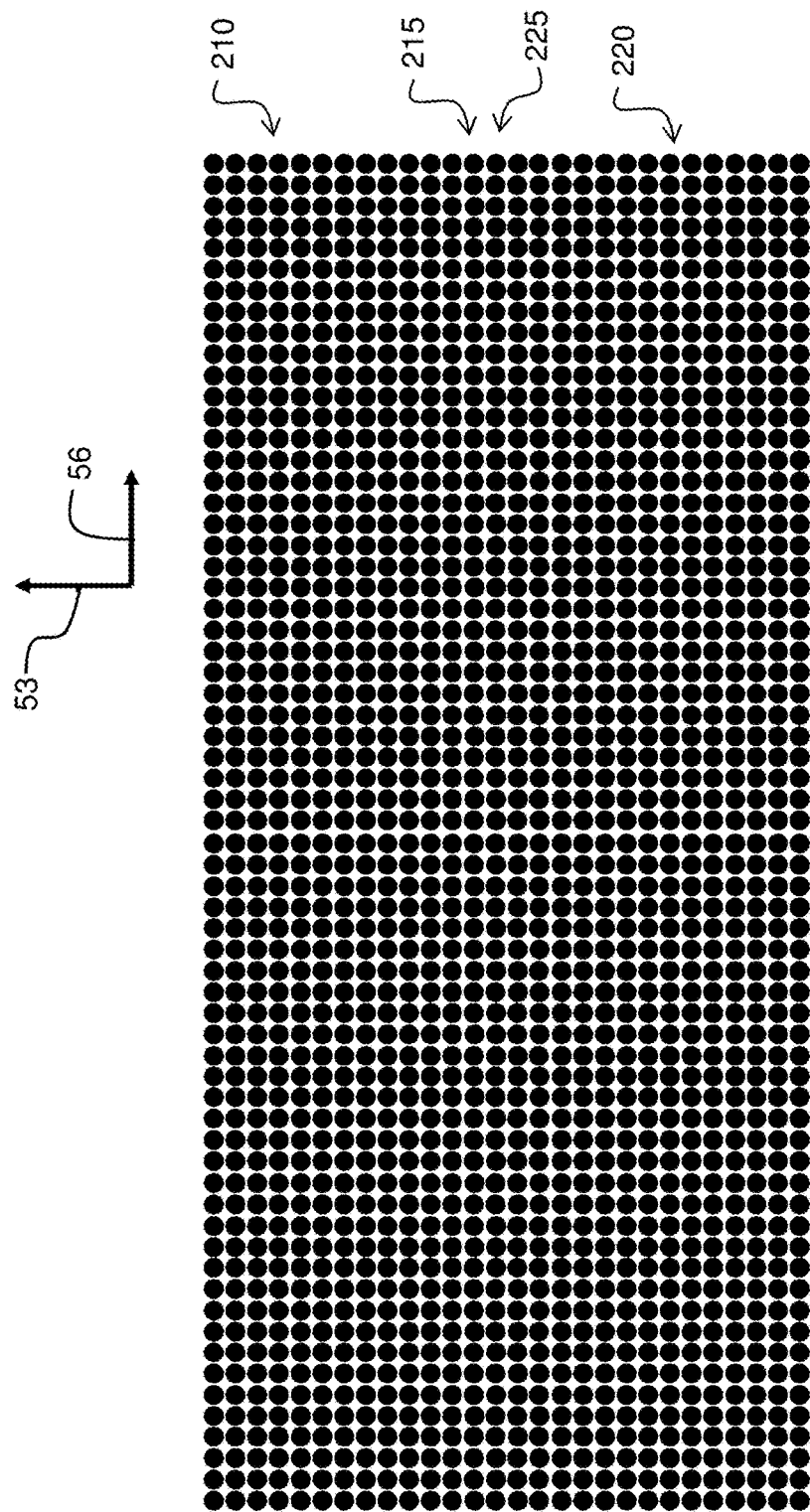
FIG. 7 shows the resulting image quality resulting from an ideal recording medium advance between the pair of swaths shown in FIG. 6.
Figure 13:
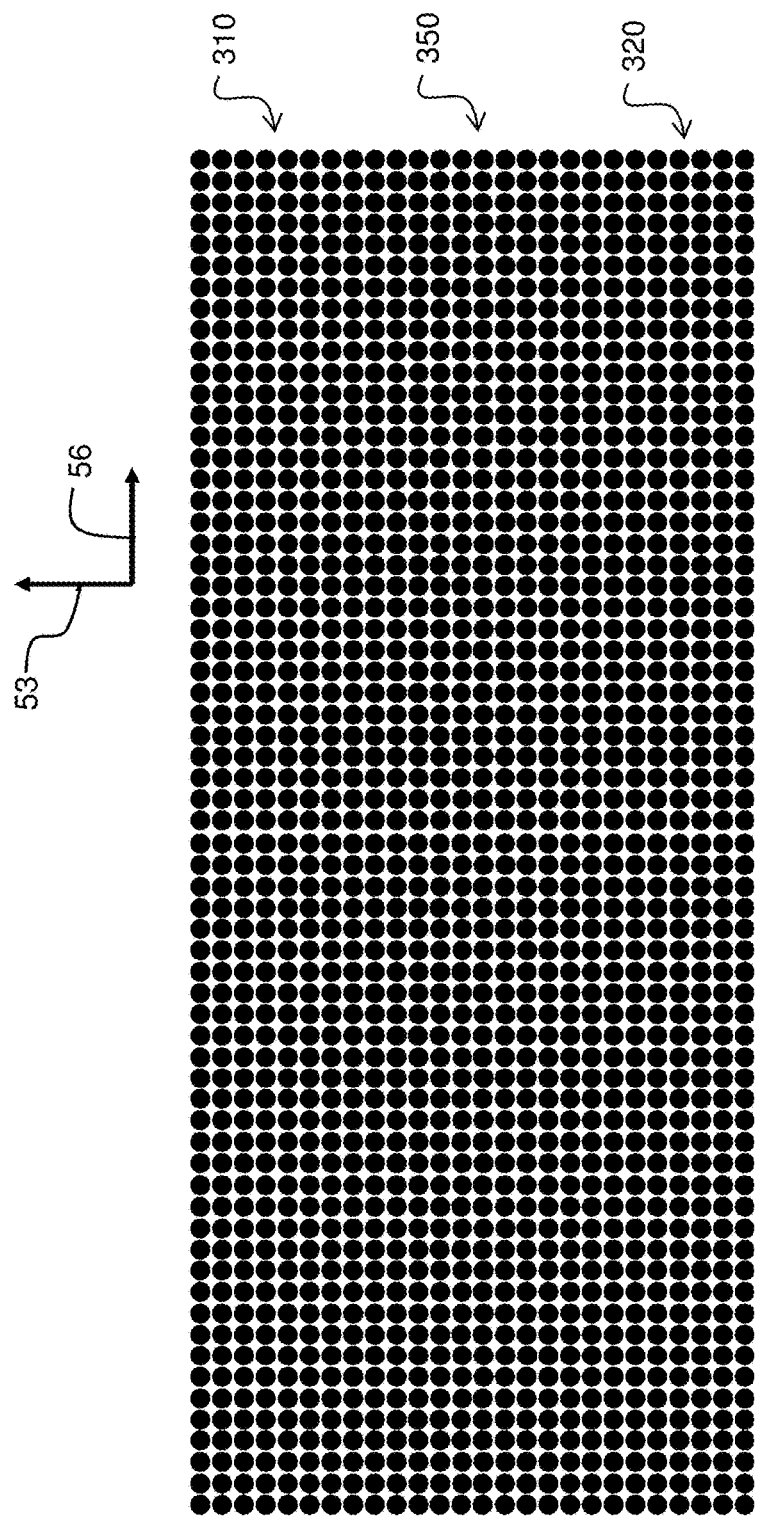
FIG. 13 shows the resulting image quality resulting from an ideal recording medium advance between the pair of swaths shown in FIG. 12.

In the example shown in FIG. 12, as described above, first swath 310 includes a total of 16 rows in this example, including the six rows 311-316 that are part of the first stitch boundary 341 and ten other rows at the top of first swath 310. The ten rows at the top of the first swath 310 (in a non-stitched region outside the first stitched region 350) are printed in a single pass. Second swath 320 includes a total of sixteen rows, including the six rows 321-326 that are part of the second stitch boundary 342 and ten other rows at the bottom of second swath 320. The separation between rows is d. FIG. 13 shows the resulting dot pattern after printing swaths 310 and 320 with the ideal medium advance distance D=10d for the case of where the image data corresponds to 100% coverage. There are twenty six rows of dots including the top ten rows printed in swath 310, the bottom ten rows printed in swath 320, and the middle six rows in the first stitched region 350 that are printed complementarily in swaths 310 and 320. Image quality in FIG. 13 is similar to that in FIG. 7 where the medium advance distance was also ideal.

Figure 14:
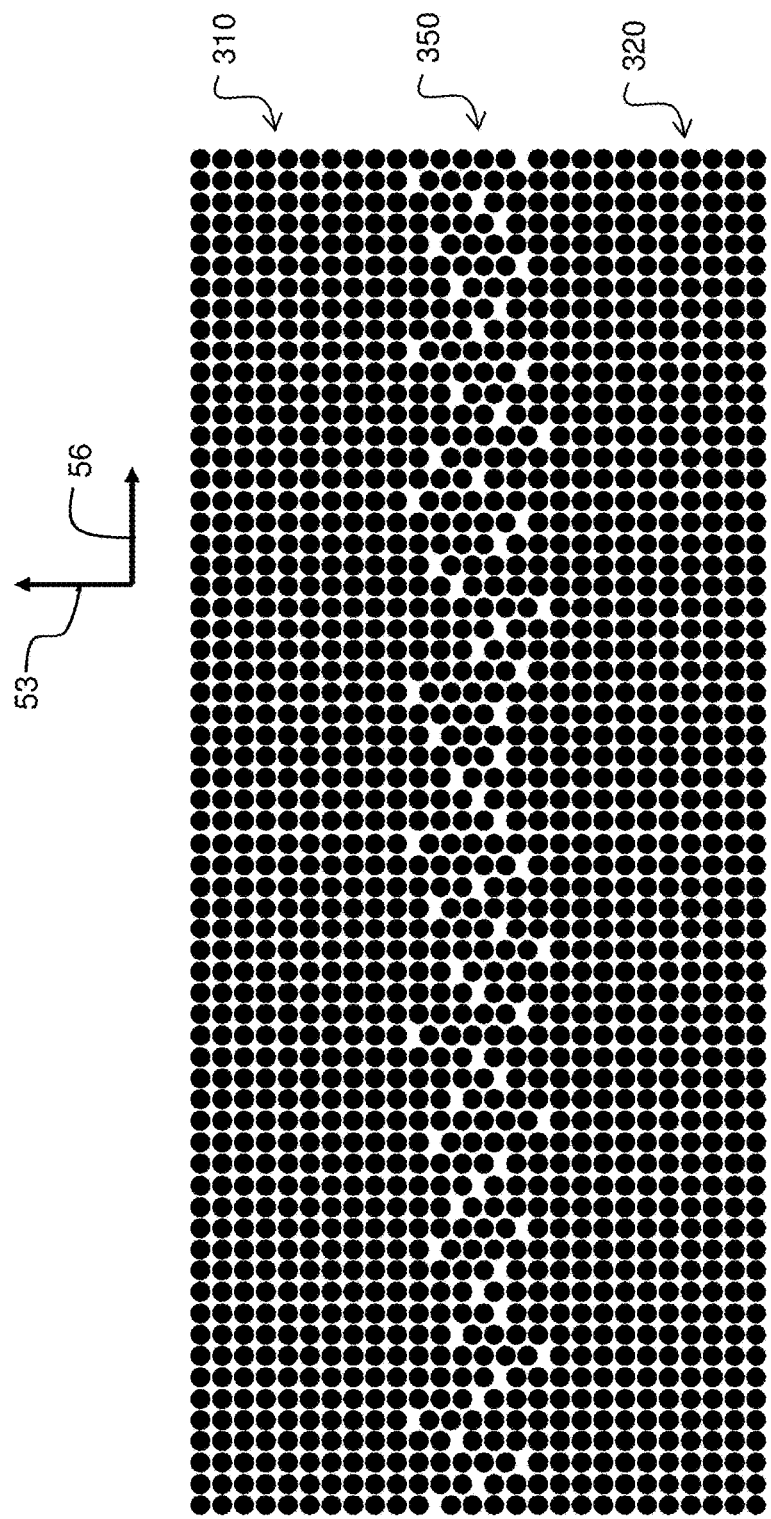
FIG. 14 shows the resulting image defect resulting from a recording medium advance distance between the FIG. 12 pair of swaths that is half a pixel row spacing too large.

Advantages in improved image quality in this example become apparent when the medium advance distance is not ideal. FIG. 14 shows the image quality in the first stitch region 350 that results from the dot configurations of FIG. 12 if the medium advance distance is half a row spacing distance d too large, i.e. 10.5d in this example. Although there is a visible image defect in the first stitched region 350, it is much less noticeable than the corresponding image defect in the overlapping interface region 215/225 shown in FIG. 8 where the medium advance distance was also half a row spacing distance d too large and the dot configuration included interspersing of dots between the first swath 210 and the second swath 220 along the first direction 53 in the interface region.

Figure 15:
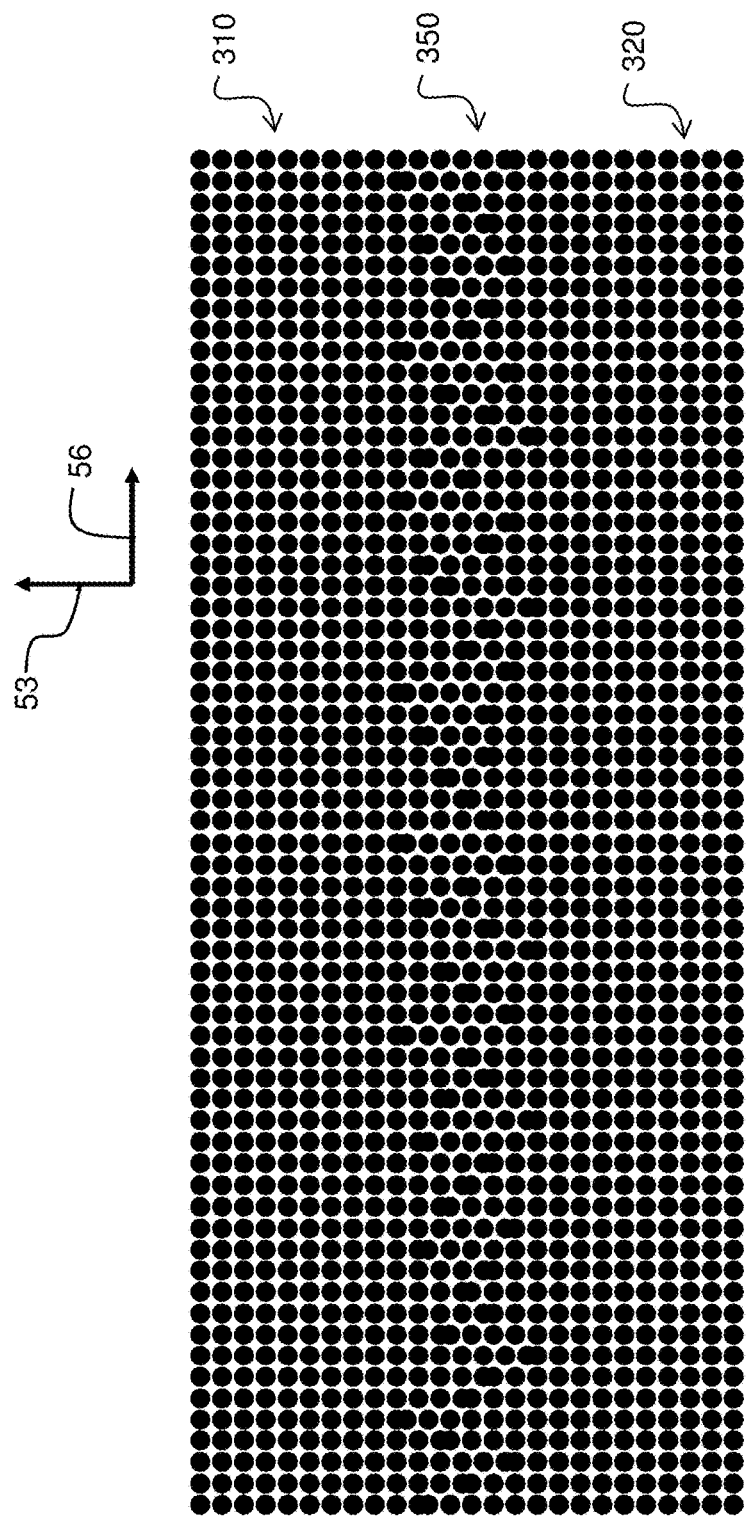
FIG. 15 shows the resulting image defect resulting from a recording medium advance distance between the FIG. 12 pair of swaths that is half a pixel row spacing too small.

FIG. 15 shows the image quality in the first stitch region 350 that results from the dot configurations of FIG. 12 if the medium advance distance is half a row spacing distance d too small, i.e. 9.5d in this example. The resulting image defect is much less noticeable than the corresponding image defect in the overlapping interface region 215/225 shown in FIG. 9 where the medium advance distance was also half a row spacing distance d too small and the dot configuration included interspersing of dots between the first swath 210 and the second swath 220 along the first direction 53 in the interface region.

Figure 16:
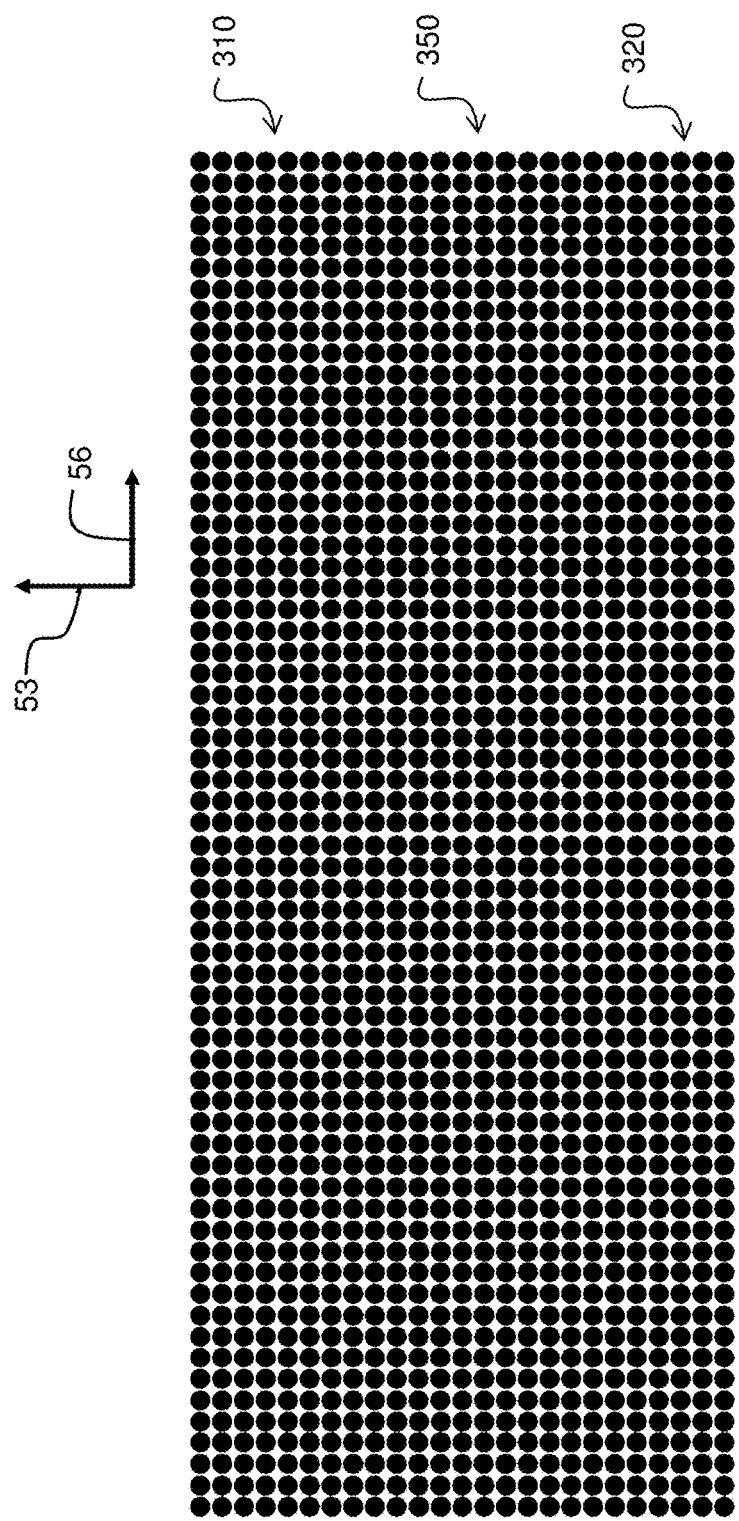
FIG. 16 shows the resulting image defect resulting from a recording medium advance distance between the FIG. 12 pair of swaths that is one pixel row spacing too large.

FIG. 16 shows the image quality in the first stitch region 350 that results from the dot configurations of FIG. 12 if the medium advance distance is one row spacing distance d too small, i.e. 9.0d in this example. The resulting image defect is not noticeable in FIG. 16, as dots have landed on top of other dots. There is one fewer row of dots in FIG. 16 compared with FIG. 13 as a result. In actuality, ink spreading due to multiple drops landing in the same location would cause a modestly darker line, but the defect would still be significantly less noticeable than in FIG. 10 where the medium advance distance was also one row spacing distance d too small and the dot configuration included interspersing of dots between the first swath 210 and the second swath 220 along the first direction 53 in the interface region.

Comparing the image defect for a medium advance distance that is too large by half a row spacing d (FIG. 14) with the image defect for a medium advance distance that is too small by half a row spacing d (FIG. 15) it can be seen that it can be better to have too small of a medium advance distance than to have too large of a medium advance distance. In some embodiments, if the nominal spacing of first dots in the first direction 53 (e.g. the medium advance direction) is d, and if the ideal advance distance is D (for positioning endmost first dots of the first swath and adjacent endmost second dots of the second spots to be spaced by d in the first direction) it can be advantageous to bias the medium advance distance so that a nominal actual advance distance is less than D. In order to reduce the amount of unintentional overlap of rows of the first swath and the second swath, it can be advantageous to bias the medium advance distance so that a nominal actual medium advance distance is greater than D−d, for example D−d/2 as in FIG. 15. If an expected fluctuation in medium advance distance is equivalent to d/2, having such a nominal actual advance distance of D−d/2 would result in a range of actual medium advance distances from D (as in FIG. 13) to D−d (as in FIG. 16) for example. In the examples described above, the ideal medium advance distance D was around 10d. For typical printheads (having arrays of hundreds of drop ejectors) the ideal medium advance distance is several hundred times d, so biasing the medium advance distance to be smaller than the ideal medium advance distance by less than d would result in an error in the image length by less than 1%.

An advantageous feature of the dot configurations of first swath 310 shown in the example of FIG. 12 is that no adjacent columns of allowable dot locations have the same extent along the first stitch boundary 341 of first swath 310. Since the first stitch boundary 342 of second swath 320 is complementary to first stitch boundary 341, it follows that no adjacent columns of allowable dot locations have the same extent along the first stitch boundary 342 of second swath 320. Such a varying of the extent from stroke to stroke further helps to reduce the visibility of image defects between stitched swaths.

Figure 17:
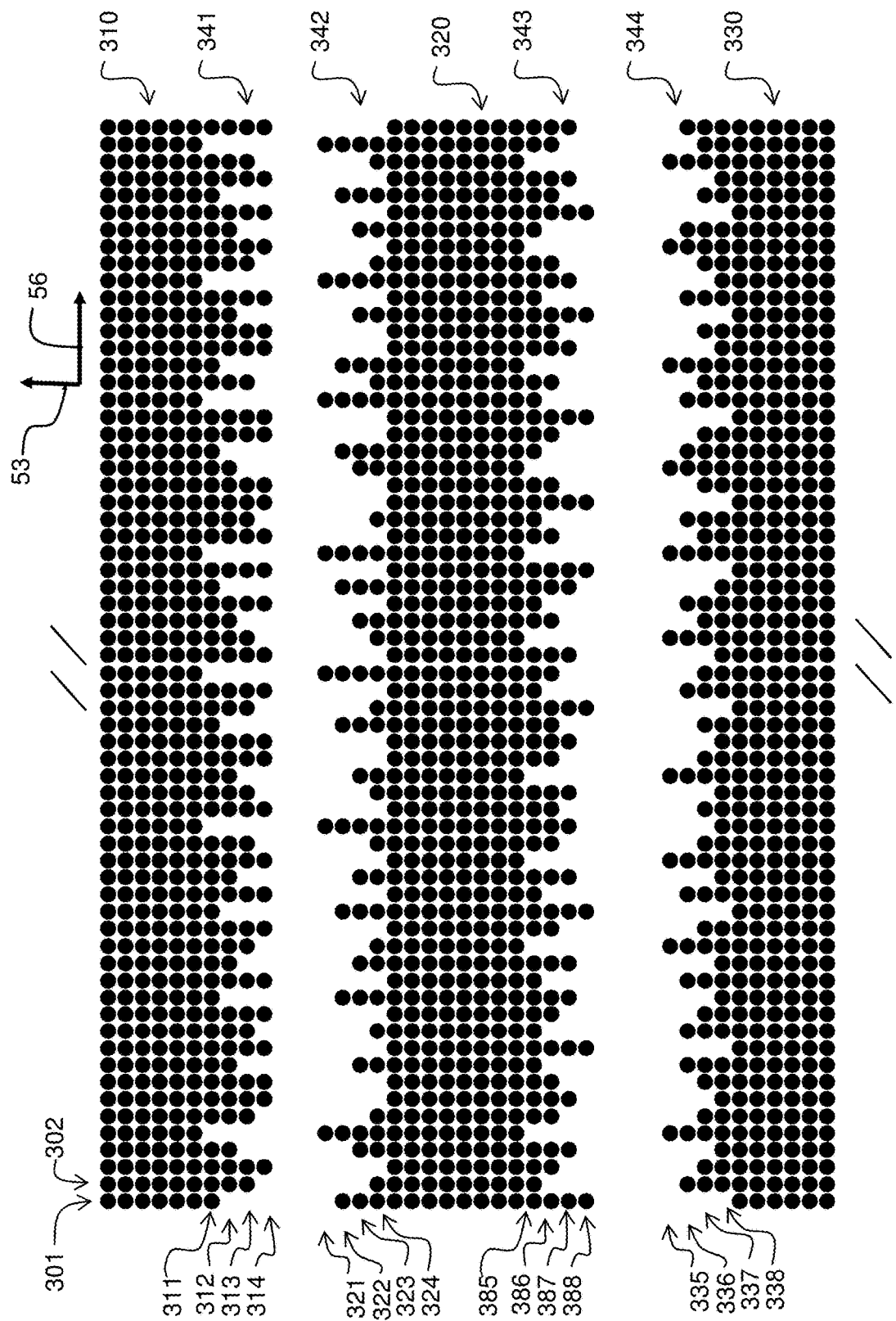
FIG. 17 shows three swaths of dots arranged according to an embodiment.

FIG. 17 shows a portion of a first swath 310 (with the diagonal lines above indicating that the first swath 310 continues in that direction), a second swath 320, and a portion of a third swath 330 (with the diagonal lines below indicating that the third swath 330 continues in that direction) according to an embodiment. First stitch boundary 341 of first swath 310 includes four rows 311, 312, 313 and 314. First stitch boundary 342 of second swath 320 includes four rows 321, 322, 323 and 324 that are respectively complementary to rows 311, 312, 313 and 314. Similar to the example described above with reference to FIG. 12, the first dots in the first swath 310 along its first stitch boundary 341 have an irregular extent; and the second dots in the second swath 320 along its first stitch boundary 342 have an irregular extent that is complementary to the irregular extent of the first stitch boundary 341 of the first swath 310. In addition, second swath 320 in FIG. 17 has a second stitch boundary 343 (including rows 385, 386, 387 and 388) that is opposite the first stitch boundary 342 of the second swath 320, and the second dots have an irregular extent along the second stitch boundary 343 of the second swath. Third swath 330 of third dots is printed by printing a third series of print strokes, the dots printed by each print stroke being disposed along the first direction 53 (medium advance direction) and spaced apart from other print strokes of the third series along the scan direction 56. Third swath 330 has a second stitch boundary 344 (including rows 335, 336, 337 and 338), such that when it is proximate the second stitch boundary 343 of the second swath 320 (as in FIG. 18) a second stitched region 360 is formed. Allowable locations of third dots have an irregular extent along the second stitch boundary 344 of the third swath 330 that is complementary to the irregular extent along the second stitch boundary 343 of the second swath 320. In the example shown in FIGS. 17 and 18 the second dots and the third dots in the second stitched region 360 are not interspersed along the first direction 53. In other embodiments (not shown) there can be a small amount of interspersing of second dots and third dots in the second stitched region 360, but fewer than 5%, preferably fewer than 3%, more preferably fewer than 1% and most preferably 0% are interspersed, i.e. the allowable locations of second dots and the allowable locations of third dots in the second stitched region 360 are substantially not interspersed along the first direction 53.

In the example shown in FIG. 17 it can be seen that the irregular extent of the second dots along the second stitch boundary 343 of the second swath 320 is different from the irregular extent of the first dots along the first stitch boundary 341 of the first swath 310. For example, the extent of dots in dot column 301 along first stitch boundary 341 (printed by a first stroke in first swath 310) is one dot long. In other words there is a dot in row 311 in dot column 301 of first stitch boundary 341 of first swath 310, but there are no dots in rows 312-314 of the first stitch boundary 341. By comparison, the extent of dots in dot column 301 along second stitch boundary 343 (printed by a first stroke in second swath 320) is four dots long. In other words there are dots in rows 385, 386, 387 and 388 in dot column 301 of second stitch boundary 343 of second swath 320. In dot column 302 the extent of allowable dot locations along the first stitch boundary 341 of first swath 310 is three dots long (rows 311, 312 and 313), while the extent of allowable dot locations along the second stitch boundary 343 of the second swath 320 is one dot long (row 385). The eye is most sensitive to regular patterns. It can be advantageous to have different irregular extents in the different stitch boundaries.

Figure 18:
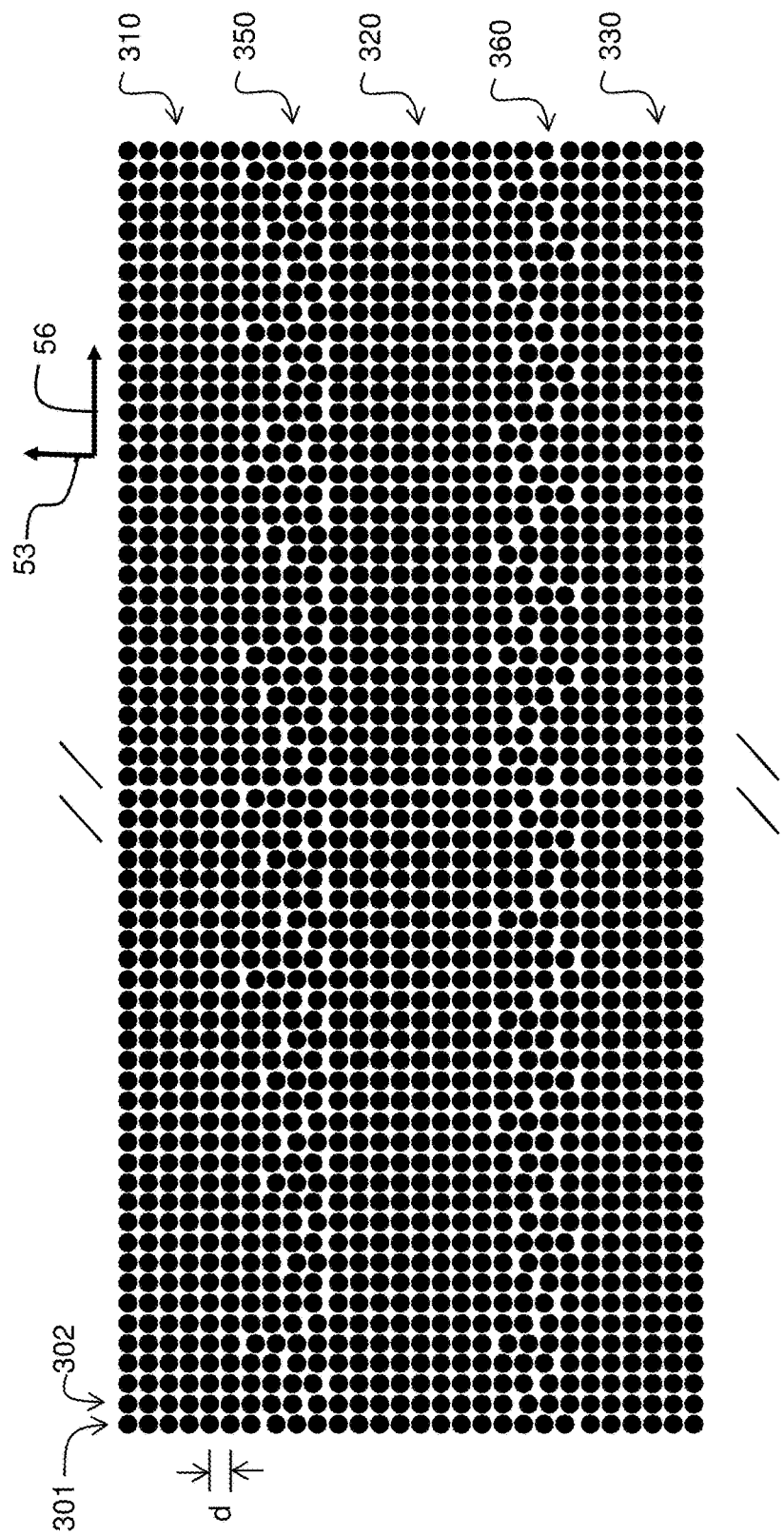
FIG. 18 shows the resulting image defect resulting from a recording medium advance distance between each adjacent FIG. 17 pair of swaths that is half a pixel row spacing too large.

In order to see clearly the first stitched boundary 350 and the second stitched boundary 360 corresponding to the swath configurations shown in FIG. 17, the dot patterns resulting from media advance distances that are half a row spacing d too large between the first swath 310 and the second swath 320, as well as between the second swath 320 and the third swath 330 are shown in FIG. 18 for the case where the image data corresponds to 100% coverage.

Figure 19:
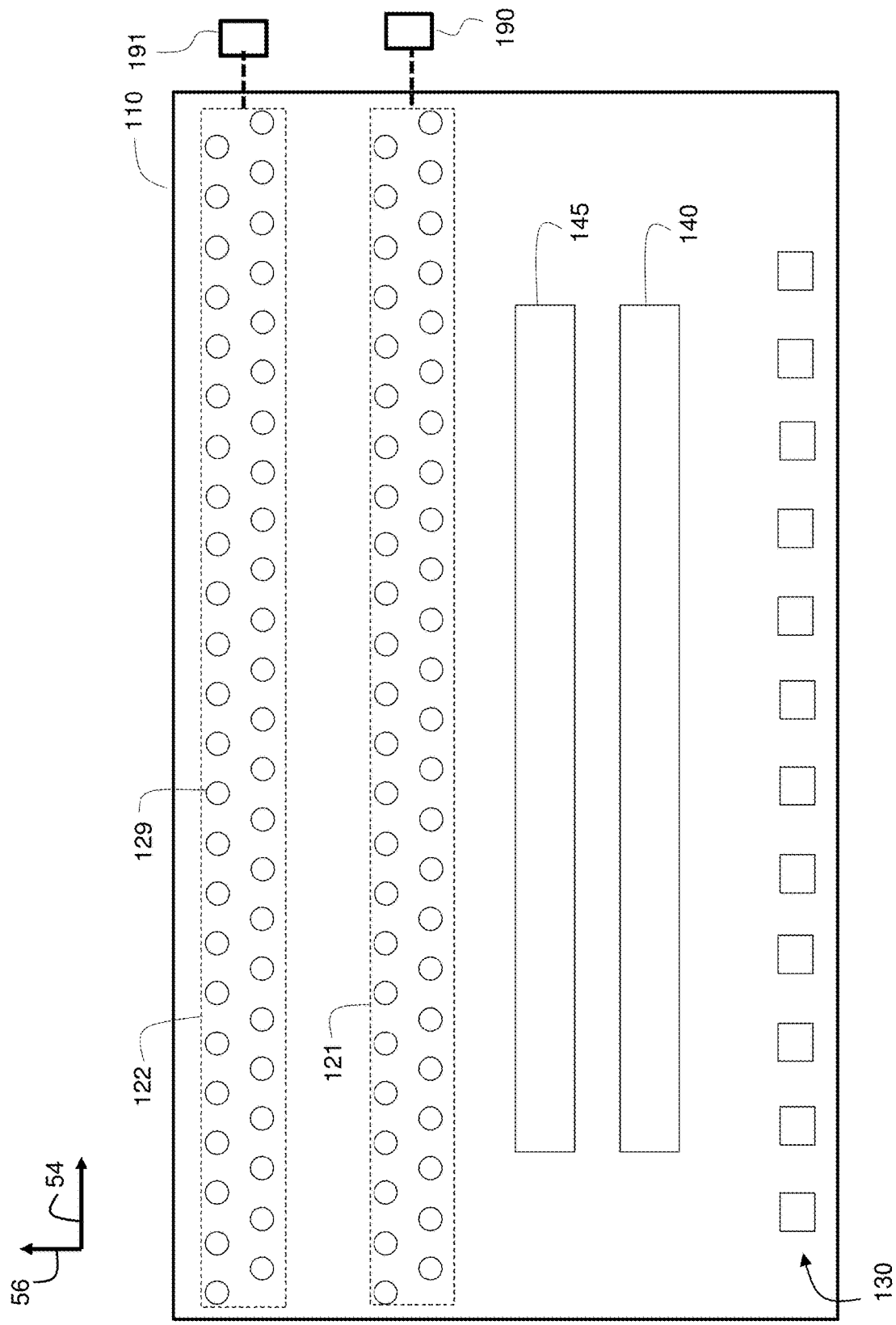
FIG. 19 shows a top view of a drop ejector array device having two drop ejector arrays, each independently connected to an ink source.

In some embodiments, a printhead can have a plurality of drop ejector arrays. FIG. 19 shows a top view of a drop ejector array device 110 having a first drop ejector array 121 and a second drop ejector array 122 plus logic circuitry 140, driver circuitry 145, and input/output pads 130. A first ink source 190 provides ink to first drop ejector array 121, and a second ink source 191 provides ink to second drop ejector array 122. Similar to drop ejector array 120 shown in FIG. 11, drop ejector array 121 includes a pair of rows of drop ejectors 129 that extend along array direction 54 and that are staggered with respect to each other in order to provide increased printing resolution, and this is similarly true of drop ejector array 122. Corresponding drop ejectors of drop ejector array 121 and drop ejector array 122 are aligned along scan direction 56, so that as recording medium 60 (FIG. 11) is moved along scan direction 56 relative to drop ejector array device 110, with the proper timing of ejection a drop of ink from first ink source 190 can be ejected by first drop ejector array 121 onto the same position as a drop of ink from second ink source 191 ejected by second drop ejector array 122.

Figure 20A:
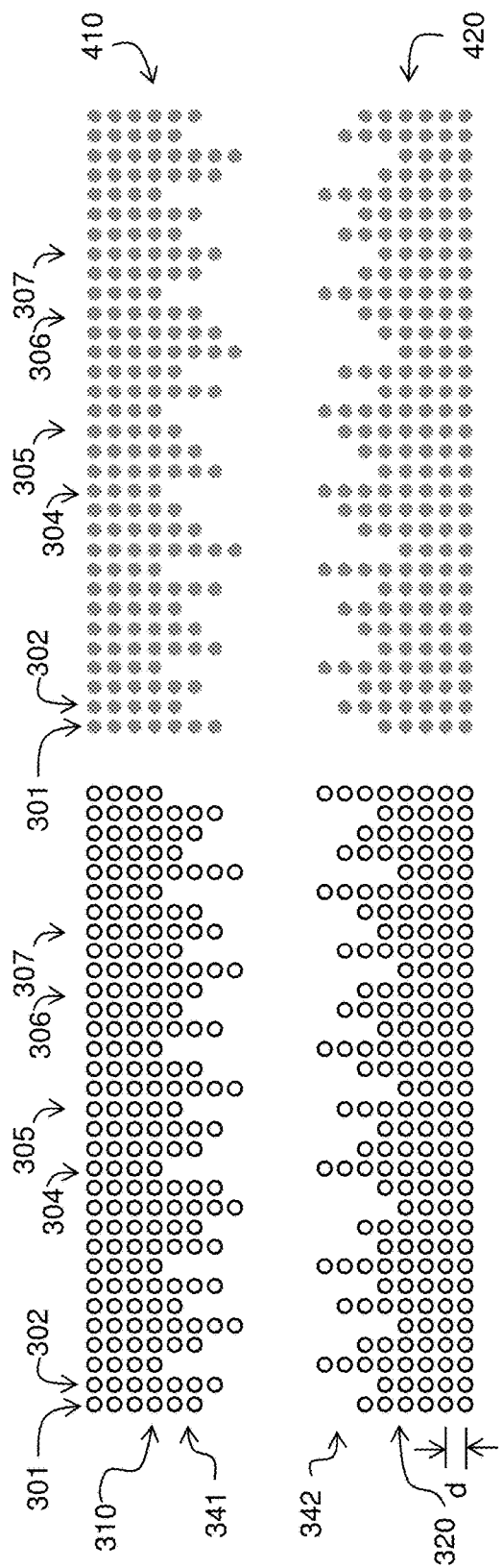
FIG. 20A shows dots of a first type printed in a first swath and a second swath, as well as dots of a second type printed in a first swath and a second swath according to an embodiment, where the first type dots and second type dots are separated for clarity.
Figure 20B:
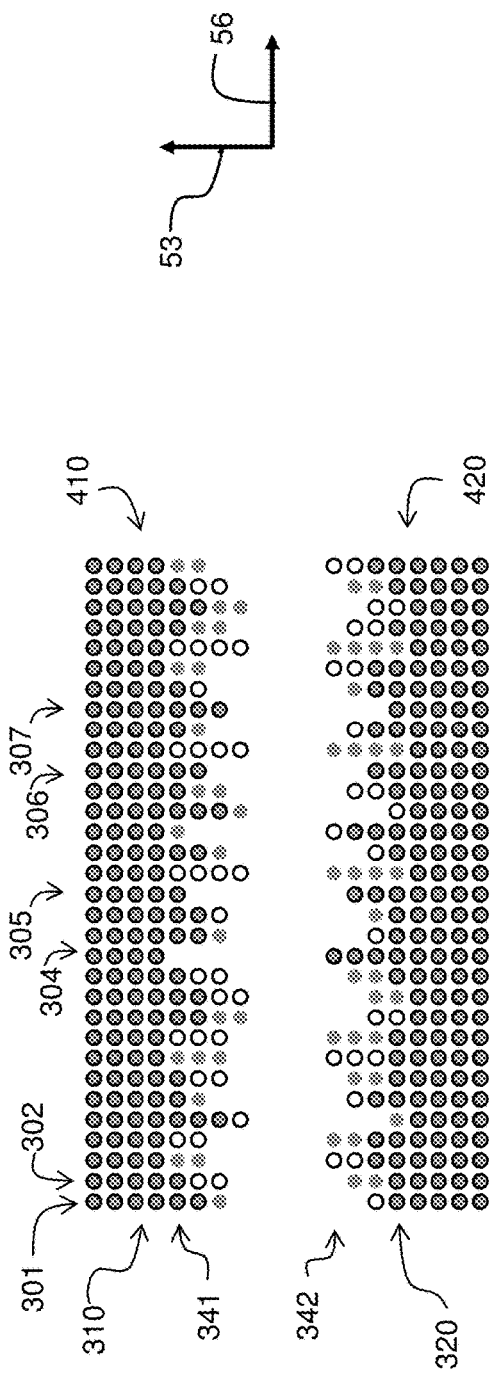
FIG. 20B shows the combined first swath and the combined second swath, where the first type dos and the second type dots of FIG. 20A are not separated.

FIG. 20A shows dots of a first type represented by unfilled circles being printed in a first swath 310 and a second swath 320, as well as dots of a second type represented by gray circles being printed in a first swath 410 and a second swath 420. The swaths of the first type and the swaths of the second type are shown displaced horizontally in FIG. 20A so that they can be clearly seen. During printing, first swath 310 of the first type coincides with first swath 410 of the second type, and similarly second swath 320 of the first type coincides with second swath 420 of the second type so that dot columns 301 are aligned as shown in FIG. 20B. A column of dots of the first type that substantially coincides with corresponding column of dots of the second type (such as the unfilled circles in dot column 302 and the gray circles in dot column 302) are called aligned columns herein. As in previous embodiments described above, first swath 310 of first type dots (represented by unfilled circles) is printed by printing a first series of print strokes. Dots printed by each print stroke are disposed along a first direction 53 (medium advance direction) and dots of each print stroke are spaced apart from dots of other print strokes along the scan direction 56. The first dots of the first type have an irregular extent along the first stitch boundary 341 of the first swath 310. Also as described above, in second swath 320 second dots of the first type printed by each print stroke are disposed along the first direction and dots of each print stroke are spaced apart from dots of other print strokes along the scan direction 56. The second dots of the first type have an irregular extent along at least the first stitch boundary 342 of the second swath 320 that is complementary to the irregular extent along the first stitch boundary 341 of the first swath 310. In addition as shown in FIG. 20A, a first swath 410 of first dots of a second type (represented by gray circles) is printed by printing a first series of print strokes for second-type dots. Dots printed by each print stroke are disposed along the first direction and are spaced apart from dots of other print strokes of the first series for second-type dots along the scan direction 56. As shown in FIG. 20B, the first swath 410 of first dots of the second type in the substantially coincides with the first swath 310 of first dots of the first type except that the first dots of the second-type have an irregular extent along at least the first stitch boundary 341 that is different from the irregular extent of the first dots of the first-type dots. For example, in dot column 301 the first type dots of first swath 310 extend by two dots at the first stitch boundary 341, while the second type dots of first swath 410 extend by three dots at the first stitch boundary 341 in dot column 301. Additionally as shown in FIG. 20A, a second swath 420 of second dots of the second type is printed by printing a second series of print strokes for second-type dots. Dots printed by each print stroke are disposed along the first direction 53 and are spaced apart from dots of other print strokes of the second series for second-type dots along the scan direction 56. The second-type dots have an irregular extent along at least the first stitch boundary 342 of the second swath 420 for second-type dots that is complementary to the irregular extent along the first stitch boundary 341 of the first swath 410 for second-type dots, where the first dots of the second type and the second dots of the second type in the stitched region are substantially not interspersed (not interspersed in the example shown in FIG. 20B) along the first direction 53 (medium advance direction).

Figure 21A:
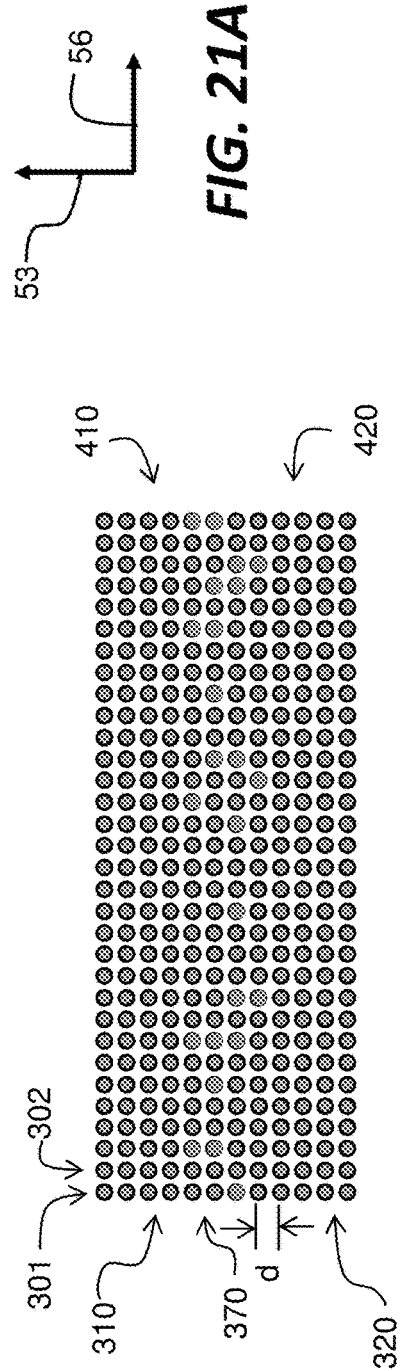
FIG. 21A shows the resulting image quality resulting from an ideal recording medium advance between the pair of combined swaths shown in FIG. 20B.
Figure 21B:
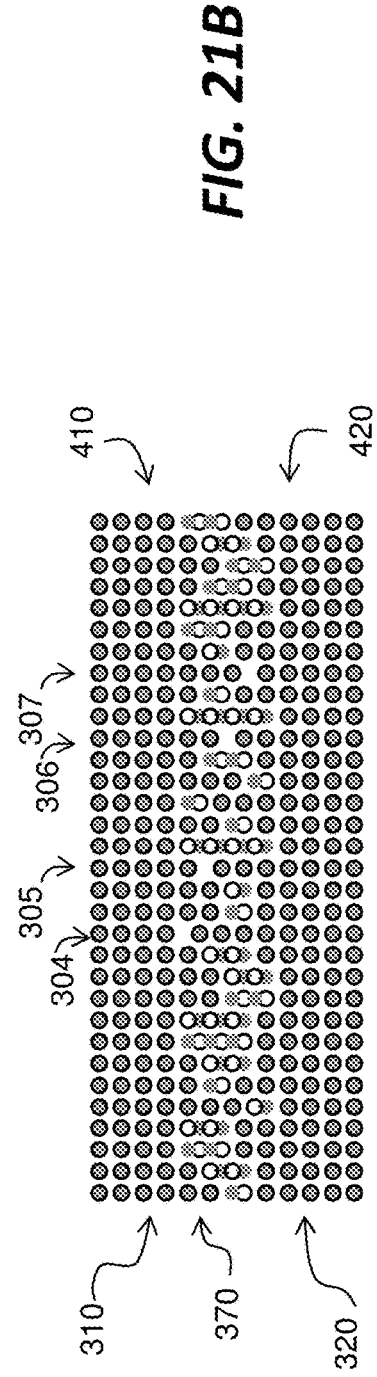
FIG. 21B shows the resulting image defect resulting from a recording medium advance distance between the FIG. 20B combined pair of swaths that is half a pixel row spacing too large.
Figure 21C:
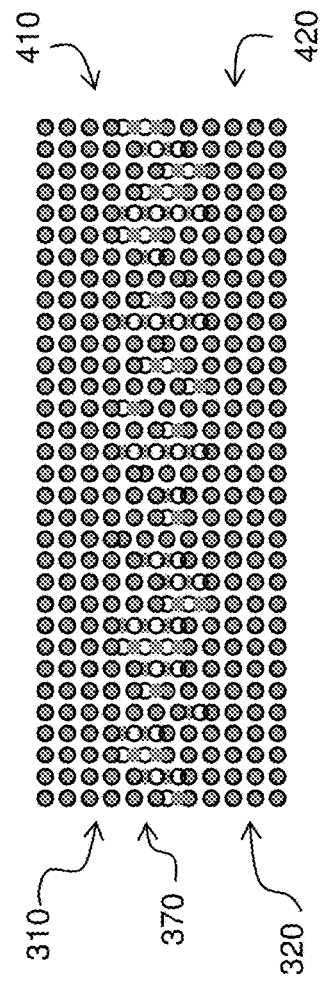
FIG. 21C shows the resulting image defect resulting from a recording medium advance distance between the FIG. 20B combined pair of swaths that is half a pixel row spacing too small.

Because the irregular extent of the second type dots in first swath 410 is different from the irregular extent of the first type dots in first swath 310 (and correspondingly the irregular extent of the second type dots in second swath 420 is different from the irregular extent of the first type dots in second swath 320) the visibility of image defects due to medium advance errors can be made less obvious. FIG. 21A shows the resulting image when the medium advance distance between the pair of first swaths 310 and 410 and the pair of second swaths 320 and 420 shown in FIG. 20B is the ideal distance D. FIG. 21B shows the resulting image when the medium advance distance is half a row spacing d too large, and FIG. 21C shows the resulting image when the medium advance distance is half a row spacing d too small. Compared with the image defect at stitched region 350 in FIG. 14 where the medium advance distance is half a row spacing d too large, the image defect in stitched region 370 in FIG. 21B is less obvious because the different irregular extents of the second type dots and the first type dots have helped to fill in the white spaces that would otherwise result.

In the example shown in FIG. 20A the irregular extent of first-type dots in first swath 310 is the same as the irregular extent of second-type dots in first swath 410 in several of the dot columns. In particular, the irregular extent is four dots for both in dot column 304, five dots for both in dot column 305, six dots for both in dot column 306, and seven dots for both in dot column 307. As a result, the image quality in FIG. 21B (medium advance distance of half a row d too large) is degraded slightly by the appearance of dot vacancies in those columns. The best image quality, whether the medium advance distance is too large or too small, is obtained when the irregular extent of allowable first-type dot locations in first swath 310 is different from the irregular extent of allowable second-type dot locations in first swath 410 in each aligned dot column.

In the embodiment described above with reference to FIGS. 19 through 21C, the first type dots can be printed with a first ink (e.g. from first ink source 190 of FIG. 19) while the second type dots can be printed with a second ink (e.g. from second ink source 191 of FIG. 19). In other words the first type dots are printed with a different material than the second type dots. In other embodiments, the first drop ejector array 121 can be designed to eject ink drops of a different nominal size than the second drop ejector array 122, for example for gray-scale printing. In such embodiments the first type dots have a different nominal size than the second type dots. They can be printed with the same ink if drop ejector arrays 121 and 122 are connected to the same ink source or with a different ink if drop ejector arrays 121 and 122 are connected to different ink sources.

In some embodiments the allowable dot locations of first type dots in the first swath 310 are configured to have a complementary irregular extent in the stitched region 370 to the irregular extent of the allowable dot locations of second type dots in the second swath 420; and correspondingly the allowable dot locations of the second type dots in the first swath 410 are configured to have a complementary irregular extent in the stitched region 370 to the irregular extent of the allowable dot locations of first type dots in the second swath 320. In such embodiments the first type of dots and the second type of dots are typically printed with the same material but have a different nominal size.

FIG. 22 shows a printhead 500 (similar to a printhead disclosed in U.S. Pat. No. 6,832,823) that can be used in other embodiments of the invention. Printhead 500 includes a first drop ejector array device 510 having a first array 515 of drop ejectors 129 and a second drop ejector array device 520 having a second array 525 of drop ejectors. Printhead 500 includes a mounting plate 505 to which first and second drop ejector array devices 510 and 520 are attached such that second end 512 of first array 515 overlaps first end 521 of second array 525 of drop ejectors along the first direction 53. For clarity in FIG. 22, only a pair of drop ejectors at second end 512 of first array 515 is shown overlapping a pair of drop ejectors at first end 521 of second array 525. More commonly there would typically be overlapping of at least four drop ejectors. There can be an alignment error of first drop ejector device 510 relative to second drop ejector array device 520, so that drop ejectors 129 from first array 515 and second array 525 that are intended to be perfectly aligned along scan direction 56 are inadvertently displaced from each other along first direction 53. As a result, image regions that are printed by the two arrays can be subject to white stripe banding or dark stripe banding depending upon the size and direction of the alignment error.

In order to reduce the visibility of such image defects from overlapping arrays such as those on printhead 500 shown in FIG. 22, the method of printing described above is adapted. A first swath 310 (FIG. 12) of first dots is printed by printing a first series of print dots using a first array 515. Dots printed by each print stroke are disposed along first direction 53 and are spaced apart from dots printed by other print strokes of the first series along the scan direction 56. The first dots have an irregular extent along at least a first stitch boundary 341 (FIG. 12) of the first swath 310. The irregular extent is confined within the region of overlap between first array 515 and second array 525. A second swath 320 (FIG. 12) of second dots is printed by printing a second series of print strokes using second array 525. Dots printed by each print stroke are disposed along the first direction 53 and are spaced apart from dots printed by other print strokes of the second series along the scan direction 56. The second dots have an irregular extent along at least a first stitch boundary 342 (FIG. 12) of the second swath 320 (FIG. 12) that is complementary to the irregular extent along the first stitch boundary of the first swath 310. The printed image includes a first stitched region 350 (as described above with reference to FIGS. 13-16) that is formed when the first stitch boundary 342 of the second swath 320 is proximate to the first stitch boundary 341 of the first swath 310. Similar to the method described above with reference to FIGS. 12-16, the first dots printed by first array 515 are substantially not interspersed with the second dots printed by second array 525 along the first direction 53 in the region of overlap.

Figure 3:
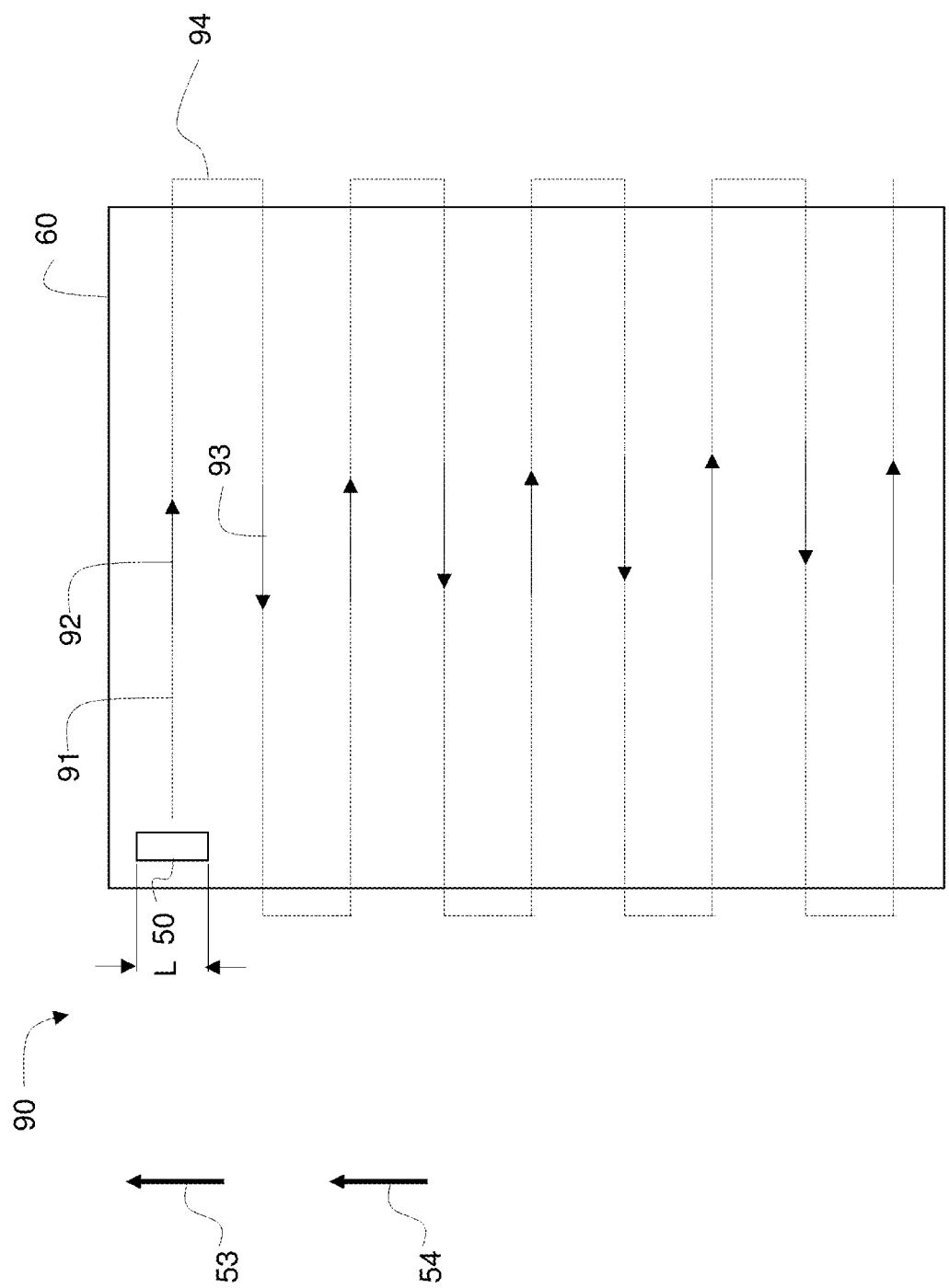
FIG. 3 schematically represents a carriage printing system that can be used in some embodiments.
Figure 4:
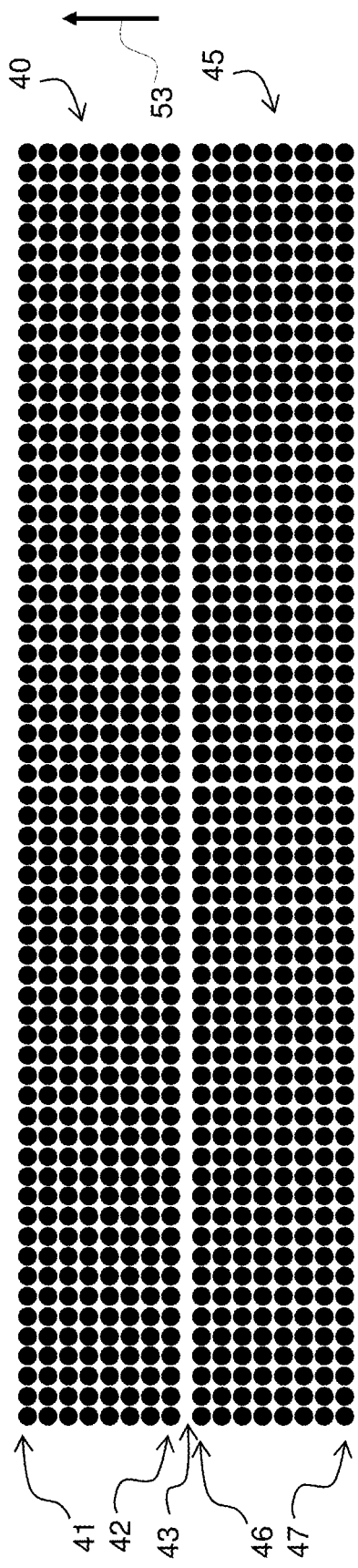
FIG. 4 shows a white line image defect between two adjacent printed swaths where advance distance of the recording medium is too large.
Figure 5:
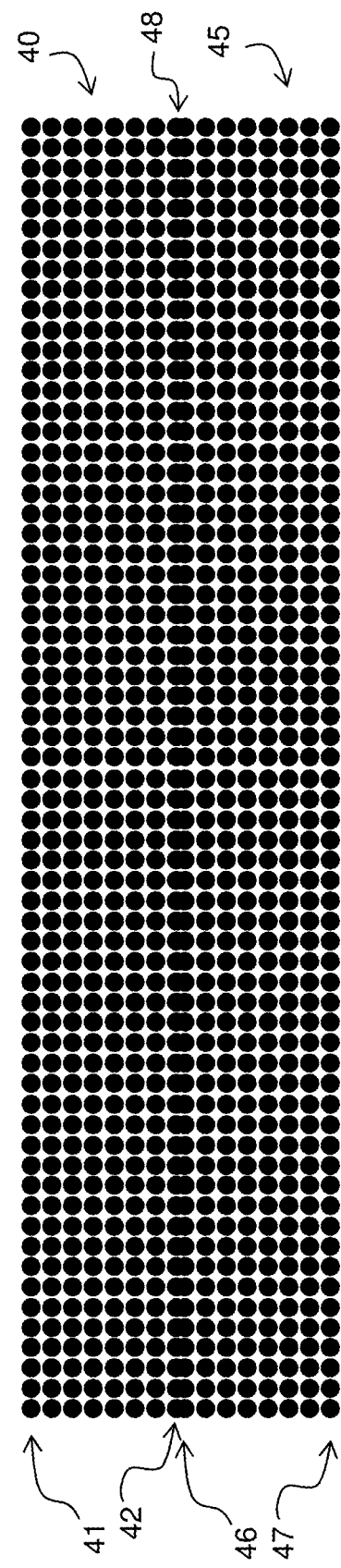
FIG. 5 shows a dark line image defect between two adjacent printed swaths where advance distance of the recording medium is too small.

In the example shown in FIG. 22, there are a total of four drop ejector array devices 510, 520, 530 and 540 each having a corresponding drop ejector array 515, 525, 535 and 545 respectively. More generically there can be M such arrays (where in FIG. 22 M=4). First array 515 is proximate to a first end 501 of printhead 500 and Mth array 545 in this example is proximate to a second end 502 of the printhead 500. Each of the arrays 515, 525, 535 and 545 overlap at least one adjacent array of printhead 500. Second end 522 of second array 525 overlaps first end 531 of third array 535, and second end 532 of third array 535 overlaps first end 541 of fourth array 545. In some embodiments the overall length of the overlapping arrays 515, 525, 535, and 545 (from the top drop ejector 129 in array 515 to the bottom drop ejector in array 545) is smaller than the length of the region of interest for printing on the recording medium. In such embodiments the printhead 500 can be mounted on a carriage, which is scanned back and forth across the recording medium with advances of the recording medium along the medium advance direction (parallel to first direction 53) after successive scans in a way similar to that described above with reference to FIG. 3 and printhead 50.

It was described above with reference to FIGS. 12 and 22 how a first swath 310 can be printed by first array 515 with an irregular extent of allowable dot locations along the first stitch boundary 341 of first swath 310, and a second swath 320 can be printed by second array 525 with a complementary irregular extent along the first stitch boundary 342 of second swath 320. Using a printhead with M overlapping arrays, such as the four overlapping arrays 515, 525, 535 and 545 of printhead 500, the stitch boundaries between the swaths printed by overlapping arrays are formed as described above for first swath 310 printed by array 515 and second swath 320 printed by array 525, and for second swath 320 printed by array 525 and third swath 330 printed by array 535 as in FIG. 17. In a carriage printing embodiment using printhead 500 with four overlapping arrays, the stitch boundary between a fourth swath (Mth swath generically) printed by array 545 during a first carriage scan of printhead 500 and a fifth swath ((M+1)th swath generically) printed by array 515 on a subsequent carriage scan of printhead 500 is formed as follows. The fourth swath of fourth dots is printed by printing a fourth series of print strokes by the fourth array 545. The dots printed by each print stroke are disposed along the first direction 53 and are spaced apart from dots printed by other print strokes of the fourth series along the scan direction 56. The fourth dots have an irregular extent along at least a fourth stitch boundary (similar to the first stitch boundary 341 of FIG. 12) of the fourth swath. The recording medium 60 (FIG. 11) is advanced along a medium advance direction that is parallel to first direction 53. The fifth swath of fifth dots is printed by a fifth series of print strokes by the first array 515. The dots printed by each print stroke are disposed along the first direction 53 and are spaced apart from dots printed by other print strokes of the fifth series along the scan direction 56. The fifth dots have an irregular extent along at least a fourth stitch boundary (similar to the second stitch boundary 342 of FIG. 12) of the fifth swath that is complementary to the irregular extent along the fourth stitch boundary of the fourth swath. In the printed image the fourth stitch boundary of the fifth swath is proximate to the fourth stitch boundary of the fourth swath to form a fourth stitched region. Similar to previous embodiments described above, the allowable locations of the fourth dots and the allowable locations of the fifth dots in the fourth stitched region are substantially not interspersed along the first direction 53.

In the example shown in FIG. 22 drop ejector arrays 515, 525, 535 and 545 are all linearly disposed along an array direction that is parallel to first direction 53. In other embodiments, the drop ejector arrays can have a staggered pair of rows that are each parallel to an array direction 54, similar to drop ejector array 120 in FIG. 11. In still other embodiments the drop ejector arrays can have other configurations, such as the two-dimensional array described in U.S. Pat. No. 10,166,769, which is incorporated herein by reference.

Figure 23:
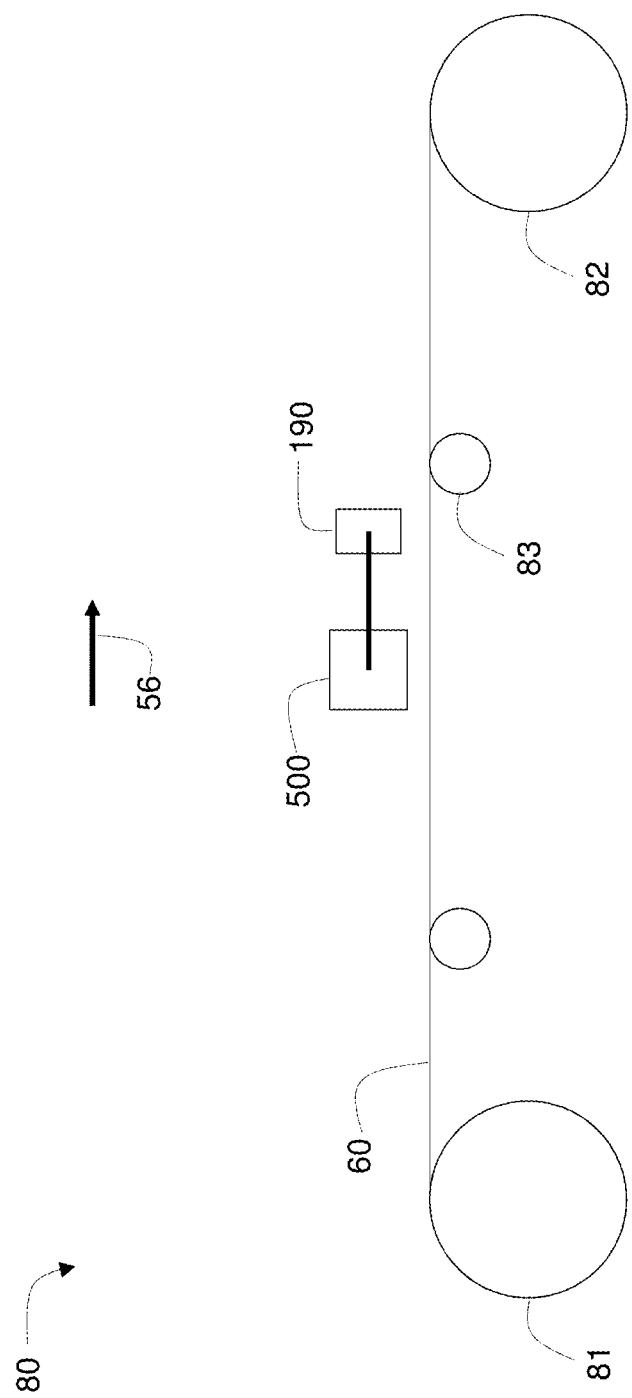
FIG. 23 schematically represents a roll-to-roll inkjet printing system that can be used in some embodiments.

In some embodiments a printhead 500 (FIG. 22) has M overlapping arrays 515, 525, 535, 545 and so on, where M is sufficiently large that the overall length of the overlapping arrays is greater than or equal to the length of the region of interest for printing on the recording medium. In such embodiments, printhead 500 can be a pagewidth printhead and the complementary irregular extent of adjacent swaths at the respective stitch boundaries with substantially no interspersing of allowable dot locations along the first direction 53 can be printed as described above with reference to FIG. 22 for first array 515 and second array 525. FIG. 23 schematically shows an example of a roll-to-roll printing system 80 that can be used with a pagewidth printhead 500. A stationary inkjet printhead 500 is in fluidic communication with an ink source 190. A web of recording medium 60 is advanced from a source roll 81 to a take-up roll 82 along scan direction 56 and is guided by one or more rollers 83. The direction of relative motion between the recording medium 60 and the printhead 500 remains constant throughout the printing process. Printhead 500 is long enough to span the web of recording medium 60, or at least the portion of recording medium 60 that is to be printed.

The embodiments described above are examples having the context of inkjet printing, but embodiments of the invention are not limited to inkjet printing. Other digital printing technologies, such as LED printing or thermal printing can also benefit from the improved print quality resulting from complementary irregular extents of stitched print swaths where there is no interspersing or substantially no interspersing of allowable dot locations along the first direction. The element on the printhead that functions to form the dots on the recording medium will be called a dot forming element herein. For drop on demand inkjet the dot forming element can be a drop ejector with a heater (thermal inkjet) or a piezoelectric actuator, for example. For an LED printhead the dot forming element is an LED. For a thermal printhead the dot forming element is typically a resistive heater.

Figure 24A:
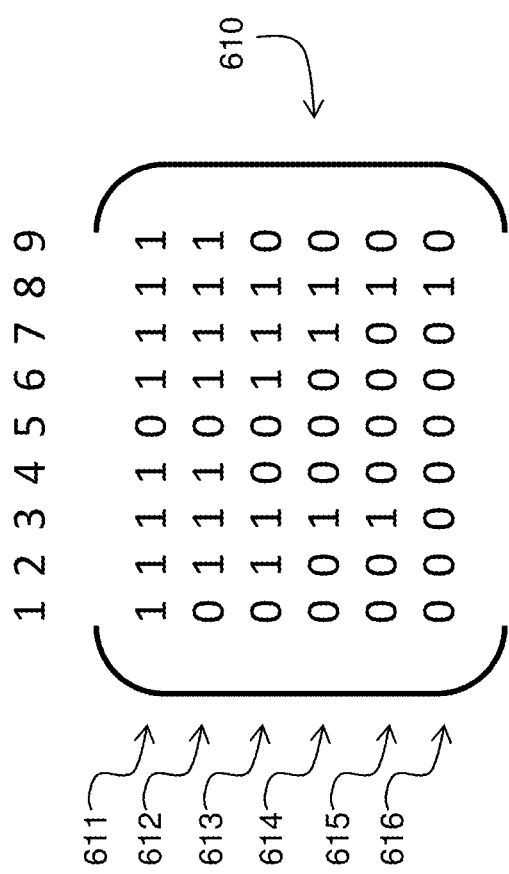
FIG. 24A shows a portion of a print mask having stitch data corresponding to part of the first swath shown in FIG. 12.
Figure 24B:
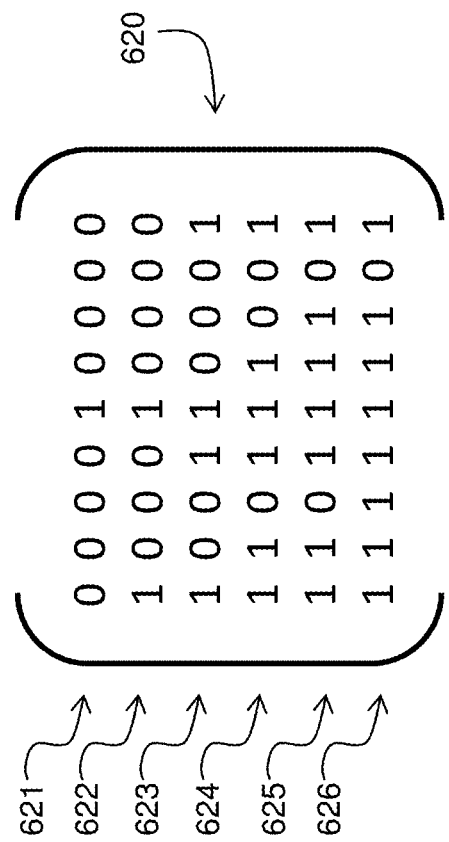
FIG. 24B shows a portion of a print mask having stitch data corresponding to part of the second swath shown in FIG. 12.

With reference to FIGS. 11, 24A and 24B an embodiment of the invention is an inkjet printing system 100 including a printhead 50 having at least one drop ejector array 120. An ink source 190 is connected to the at least one drop ejector array 120 for providing ink to be ejected. A transport mechanism 16 moves the printhead 50 relative to a recording medium 60 along a scan direction 56. For carriage printer embodiments the transport mechanism 16 moves the printhead 50 across the recording medium for successive print swaths between advances of the recording medium. For pagewidth printhead embodiments the transport mechanism 16 moves the recording medium 60 past the printhead 50 during printing. An image data source 12 provides image data signals corresponding to an image to be printed. An electrical pulse source 15 sends pulse waveforms to the printhead 50. A controller 14 receives the image data signals from the image data source 12 and sends output signals to the electrical pulse source 15 for controlling the firing of the drop ejectors in order to print the image. Controller 14 includes memory 19 where a set of print masks is stored. The print masks are used by the controller 14 for specifying which drop ejectors of printhead are responsible for printing pixels according to the image data in different swaths. Some of the print masks or some portions of the print masks specify which drop ejectors are responsible for printing pixels according to the image data in a stitched region. In the example described above in FIGS. 12 to 16, first stitched region 350 includes six raster lines of pixels that are cooperatively printed by pairs of rows in first swath 310 and second swath 320. In particular, the first raster line in stitched region 350 is cooperatively printed by rows 311 and 321; the second raster line is cooperatively printed by rows 312 and 322; and so on through the sixth raster line being cooperatively printed by rows 316 and 326. Generically, a stitched region has a height of K raster lines and in this example, first stitched region 350 has K=6 raster lines.

FIG. 24A shows at least a portion of a first print mask having first stitch mask data 610 including K=6 rows corresponding to the 6 raster lines in first stitched region 350, and m=9 columns corresponding to the nine print strokes that printed dots along first direction 53 in the first nine columns beginning at the left from column 301 in first stitched region 350 in first swath 310 (FIGS. 12-16). Ones in the mask data indicate positions where a dot is allowed to be printed and zeroes indicate positions where dots are not allowed to be printed. In first stitch mask data 610 of FIG. 24A, column 1 has a one in row 611 and zeros in rows 612 through 616. Correspondingly in FIG. 12, dot column 301 has a dot printed in row 311 of swath 310 and no dots in rows 312 through 316. Column 2 of first stitch mask data 610 has ones in each of rows 611, 612, and 613 and zeroes in rows 614 through 616. Correspondingly in FIG. 12, dot column 302 has dots printed in rows 311 through 313 of swath 310 and no dots in rows 314 through 316. In column 8 of first stitch data 610 there are no non-zero data elements, so there are ones in all rows 611 through 616. Correspondingly in FIG. 12, dot column 308 has dots printed in rows 311 through 316. Column 9 of first stitch mask data 610 has ones in each of rows 611 and 612 and zeroes in rows 613 through 616. Correspondingly in FIG. 12, dot column 309 has dots printed in rows 311 and 312 of swath 310 and no dots in rows 313 through 316. In order to ensure that there is no interspersing of dots from swath 310 and 320 in dot columns 301 through 309 in FIG. 12, for each column j=1 to 9, the first stitch mask data 610 from row k=611 to k=616 consists of all ones from the first non-zero data element of the stitched region through row k(j) of the stitched region. In other words, k(j) is the row number of the last non-zero data element in column j. In column 1 of first stitch data 610, k(1) is 1 corresponding to the one in the first row 611. In column 2, k(2) is 3 corresponding to the one in the third row 613. First stitch data mask data 610 consists of all zeros for data elements in row (k(j)+1) through row K. In other words (k(j)+1) is the row location of the first zero element in column j. In column 1 of first stitch data 610, (k(1)+1), i.e. row 2 is the row location of the first 0 that occurs in second row 612. In column 1 of first stitch data mask 610 there are all zeros from the second row 612 through the K=6$^{th}$ row 616.

Second stitch mask data 620 shown in FIG. 24B is complementary to first stitch mask data 610 shown in FIG. 24A. If there is a one in a particular position in first stitch data mask 610, there is a zero in that location in second stitch data mask 620, and vice versa. In second stitch mask data 620 of FIG. 24B, column 1 has a 0 in row 621 and ones in rows 622 through 626. Correspondingly in FIG. 12, dot column 301 has dots printed in rows 322 through 326 of swath 320 and no dot in row 321.

In embodiments of the present invention it is said that each column of the first stitch mask data consists substantially of all ones from the first non-zero data element of the stitched region through row k(j) of the stitched region. In other words fewer than 5%, preferably fewer than 3%, more preferably fewer than 1% and most preferably 0% of the first stitch mask data has data elements of zero from the first non-zero data element of the stitched region through row k(j) of the stitched region. The term substantially has a similar and complementary meaning with respect to second stitch mask data.

With reference to FIG. 11, in many embodiments the mask data is fixed in memory 19 of controller 14 and is independent of image data from image data source 12. In some embodiments the mask data can be modified in order to further reduce the visibility of the image defects at the stitched regions of swaths. If it is found during image processing in image processing unit 13 of controller 14 that there are dots that will not be printed in a stitched region of the image, the irregular extent along the stitch boundaries can be modified so that at least some of the allowable dot locations terminate in locations where a dot is not to be printed according to the image data. In other words, the irregular extent of the allowable locations of the first dots can be determined, at least in part, by the image data corresponding to the image to be printed.

In the embodiment described above with reference to FIGS. 12-16, first swath 310 includes a total of 16 rows, including the six rows 311-316 that are part of the first stitch boundary 341 and ten other rows at the top of first swath 310. The ten rows at the top of the first swath 310 (in a non-stitched region outside the first stitched region 350) are printed in a single pass. In other embodiments, the rows that are not part of the stitch boundary between swaths can be printed in multiple passes as described below with reference to FIGS. 26A and 26B.

In order to show a larger number of swaths, schematic representations of the swaths for embodiments of single-pass printing (FIGS. 25A and 25B) and two-pass printing (FIGS. 26A and 26B) are used. FIG. 25A shows six consecutively printed swaths 710, 720, 730, 740, 750 and 760, each swath being separated by a gap for clarity. Swath 710 includes a region printed in a single pass represented by a rectangle of width W (similar to the upper ten rows of dots in swath 310 of FIG. 12), and a stitch boundary 712 of swath 710 represented by diagonal lines that are understood to have an irregular extent similar to rows 311 to 316 along first stitch boundary 341 of swath 310 shown in FIG. 12. FIG. 25A is not to scale. Typically the width W of the single-pass printed region is on the order of a hundred times larger than the width w of the stitch boundary 712. Since swath 710 is the swath printed near the leading edge (or top edge) of the image on the recording medium, there is no stitch boundary at the top of swath 710. Swath 720 includes a region printed in a single pass represented by a rectangle, as well as a stitch boundary 721 of swath 720 similar to rows 321 to 326 along first boundary 342 of swath 320 shown in FIG. 12. Stitch boundary 721 of swath 720 is represented by diagonal lines of opposite slant to those that represent stitch boundary 712 of swath 710. Stitch boundary of swath 720 is understood to have an irregular extent that is complementary to the irregular extent along the stitch boundary 712 of swath 710. Swath 720 also includes a stitch boundary 722 that is similar to second stitch boundary 343 of swath 320 that is shown in FIG. 17. Swaths 730, 740, and 750 are similar to swath 720, having stitch boundaries 731 and 732, 741 and 742, and 751 and 752, each having irregular extents of allowable dot locations. Since swath 760 is the final swath of the image and is printed toward the trailing edge (or bottom edge) of the recording medium, no lower stitch boundary is needed.

FIG. 25B schematically shows the stitched regions 713, 723, 733, 743 and 753 that result when the recording medium is advanced relative to the printhead between each swath along first direction 53 by a distance that is approximately equal to the width of the single-pass printed portions. As described above with reference to FIGS. 12 and 17, in stitched region 713 the dots from stitch boundary 712 of swath 710 are substantially not interspersed with the dots from stitch boundary 721 of swath 720 along first direction 53. Similarly in stitched regions 723, 733, 743 and 753 the dots from the respective stitch boundaries of adjacent swaths are complementary to one another and are substantially not interspersed along the first direction 53.

Figures 26A, 26B:
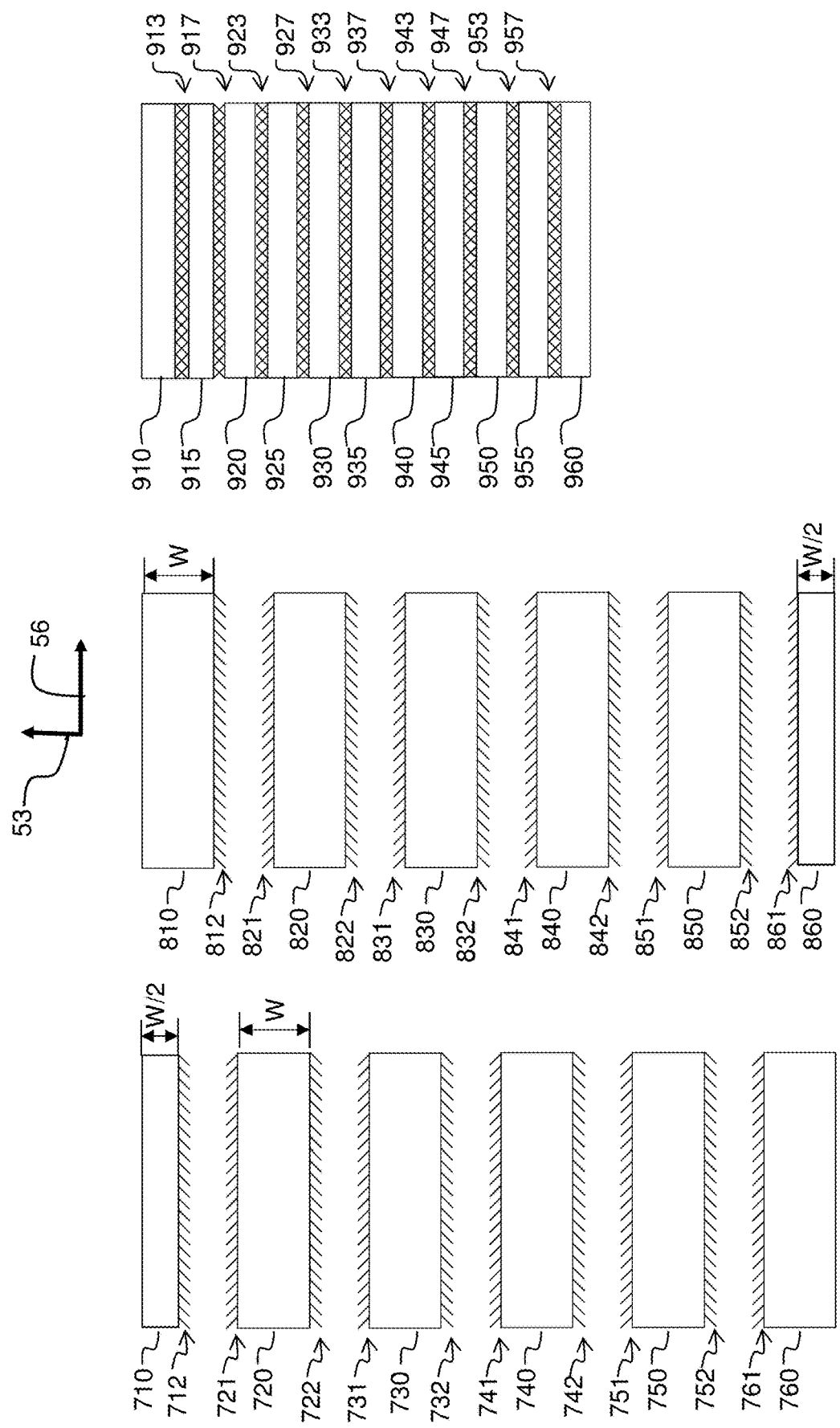
FIGS. 26A and 26B show a schematic representation of two-pass printing according to an embodiment.

FIGS. 26A and 26B illustrate an embodiment of two-pass printing, as the simplest example of multipass printing. The set of swaths 710, 720, 730, 740, 750 and 760 in FIG. 26A are similar to those described above with reference to FIG. 25A, except that the two-pass portion swath of swath 710 in FIG. 26A has a width of W/2 rather than W, printed for example by the dot forming elements in a "lower" portion of the printhead. Approximately half of the total dots corresponding to the two-pass region are allowed to be printed in swath 710. After printing swath 710, the recording medium is advanced relative to the printhead along first direction 53 by a distance approximately equal to W/2. Then swath 810 is printed. Swath 810 includes a two-pass region represented by a rectangle of width W. Dot forming elements in an "upper" portion of the printhead are allowed to print dots in the upper portion of the two-pass portion of swath 810 in complementary fashion to the dots printed in the two-pass portion of swath 710. In many embodiments approximately half of the dots in stitch boundaries 712 and 721 are printed in swaths 710 and 720 and the other half are printed in swath 810. Swath 810 also includes a stitch boundary 812 having an irregular extent similar to those described in previous embodiments. After printing swath 810, the recording medium is advanced relative to the printhead along first direction 53 by a distance approximately equal to W/2. Then swath 720 is printed. Swath 720 includes a two-pass region represented by a rectangle of width W. Dot forming elements in an "upper" portion of the printhead are allowed to print dots in the upper portion of the two-pass portion of swath 720 in complementary fashion to the dots printed in the "lower" two-pass portion of swath 810. Swath 720 also includes stitch boundaries 721 and 722, each having irregular extents similar to those described in previous embodiments. The complete image is printed successively by swaths 710, 810, 720, 820, 730, 830, 740, 840, 750, 850, 760 and 860. The full image is illustrated schematically in FIG. 26B. Two-pass printing portion 910 is printed by the two-pass portion of swath 710 and the upper two-pass portion of swath 810 as described above. Two-pass printing portion 915 is printed by the lower two-pass portion of swath 810 and the upper two-pass portion of swath 720. Two-pass portions 920, 925, 930, 935, 940, 945, 950, 955, and 960 are printed in similar fashion. Stitched region 913 is printed by the dots in stitch boundary 712 of swath 710 and dots in stitch boundary 721 of swath 720, and by dots in swath 810 in many embodiments. Stitched region 917 is printed by the dots in stitch boundary 812 of swath 810 and dots in stitch boundary 821 of swath 820, and by dots in swath 720 in many embodiments. Stitched regions 923, 927, 933, 937, 943, 947, 953, and 957 are printed in similar fashion.

As is the case for single pass printing described above with reference to FIGS. 25A and 25B, two-pass printing in FIGS. 26A and 26B is accomplished by printing a first swath 710 of first dots by printing a first series of print strokes, dots printed by each print stroke being disposed along first direction 53 and being spaced apart from other print strokes of the first series along the scan direction 56, where the first dots have an irregular extent along at least a first stitch boundary 712 of the first swath 710; and printing a second swath 720 of second dots by printing a second series of print strokes, dots printed by each print stroke being disposed along the first direction 53 and being spaced apart from other print strokes of the second series along the scan direction 56, a first stitch boundary 721 of the second swath 720 being proximate to the first stitch boundary 712 of the first swath to form a first stitched region 913, where the second dots have an irregular extent along at least the first stitch boundary 721 of the second swath 720 that is complementary to the irregular extent along the first stitch boundary 712 of the first swath 710, where the first dots and the second dots in the first stitched region are substantially not interspersed along the first direction. Note that for the two-pass printing embodiment shown in FIGS. 26A and 26B, the "second swath" 720 is not printed immediately after the "first swath" 710. Rather, an intermediate swath 810 is printed between "first swath" 710 and "second swath" 720. The same is true also if we call swath 720 the "first swath", swath 730 the "second swath" and swath 820 an intermediate swath. The same is true also if we call swath 810 the "first swath", swath 820 the "second swath" and swath 720 an intermediate swath.

Other embodiments of multipass printing have different numbers of intermediate swaths between the "first swath" and the "second swath". Three-pass printing has two intermediate swaths. Four-pass printing has three intermediate swaths. N-pass printing has (N-1) intermediate swaths between the "first swath" and the "second swath". In other words, multipass printing embodiments include printing at least one swath of dots between the steps of printing the "first swath" and printing the "second swath".

The invention has been described in detail with particular reference to certain preferred embodiments thereof, but it will be understood that variations and modifications can be effected within the spirit and scope of the invention.

The invention claimed is:

1. A method of printing stitched swaths having complementary irregular boundaries, the method comprising:
providing a printhead having at least one array of dot forming elements;
moving the printhead relative to a recording medium along a scan direction;
printing a first swath of first dots by printing a first series of print strokes, the first dots printed by each print stroke being disposed along a first direction in a corresponding column of first dots such that each column of first dots is spaced apart from other columns of first dots along the scan direction, wherein allowable locations of the first dots have an irregular extent along at least a first stitch boundary of the first swath; and
printing a second swath of second dots by printing a second series of print strokes, the second dots printed by each print stroke being disposed along the first direction in a corresponding column of second dots such that each column of second dots is spaced apart from other columns of second dots along the scan direction, a first stitch boundary of the second swath being proximate to the first stitch boundary of the first swath to form a first stitched region, wherein allowable locations of the second dots have an irregular extent along at least the first stitch boundary of the second swath that is complementary to the irregular extent along the first stitch boundary of the first swath, wherein the allowable locations of the first dots and the allowable locations of the second dots in the first stitched region are substantially not interspersed along the first direction.

2. The method of claim 1, wherein there is no interspersing of the allowable locations of the first dots and the allowable locations of the second dots in the first stitched region along the first direction.

3. The method of claim 1, wherein no adjacent columns of the first dots have the same extent along the first stitch boundary.

4. The method of claim 1, the first swath including a non-stitched region outside the first stitched region, wherein all dots that are printed in the non-stitched region are printed in a single pass.

5. The method of claim 1, the first swath being a first type swath including first dots of a first type and the second swath being a first type swath including second dots of a first type, the method further comprising:
printing a first swath of first dots of a second type by printing a first series of print strokes for second-type dots, the first dots of the second type printed by each print stroke being disposed along the first direction in a corresponding column of first dots of the second type such that each column of first dots of the second type is spaced apart from other columns of first dots of the second type along the scan direction, wherein the first swath of first dots of the second type in the first stitched region substantially coincides with the first swath of first dots of the first type in the first stitched region except that allowable locations of the second-type dots have an irregular extent along at least the first stitch boundary that is different from the irregular extent of the allowable locations of the first-type dots; and
printing a second swath of second dots of the second type by printing a second series of print strokes for second-type dots, the second dots of the second type printed by each print stroke being disposed along the first direction in a corresponding column of second dots of the second type such that each column of second dots of the second type is spaced apart from other columns of second dots of the second type along the scan direction, wherein allowable locations of second-type dots have an irregular extent along at least the first stitch boundary of the second swath that is complementary to the irregular extent along the first stitch boundary of the allowable locations of second-type dots of the first swath, wherein the allowable locations of the first dots of the second type and the allowable locations of the second dots of the second type in the stitched region are substantially not interspersed along the first direction.

6. The method according to claim 5, wherein the first-type dots have a different nominal size than the second-type dots.

7. The method according to claim 5, wherein the first-type dots are printed with a different material than the second-type dots.

8. The method according to claim 5, wherein the extent of allowable dot locations in each column of the first-type dots in the first stitched region is different from the extent of allowable dot locations in an aligned column of the second-type dots in the first stitched region.

9. The method according to claim 1, wherein the first dots have a first nominal size, and the second dots have a second nominal size that is different from the first nominal size.

10. The method of claim 1, the second swath having a second stitch boundary opposite the first stitch boundary, the allowable locations of second dots having an irregular extent along the second stitch boundary, the method further comprising:
printing a third swath of third dots by printing a third series of print strokes, the third dots printed by each print stroke being disposed along the first direction and being spaced apart from the third dots printed by other print strokes of the third series along the scan direction, a second stitch boundary of the third swath being proximate to the second stitch boundary of the second swath to form a second stitched region, wherein the allowable locations of third dots have an irregular extent along at least the second stitch boundary of the third swath that is complementary to the irregular extent of allowable locations of second dots along the second stitch boundary of the second swath, wherein the allowable locations of the second dots and the allowable locations of the third dots in the second stitched region are substantially not interspersed along the first direction.

11. The method of claim 10, wherein the irregular extent of the allowable locations of second dots along the second stitch boundary is different from the irregular extent of the allowable locations of first dots along the first stitch boundary.

12. The method of claim 10, wherein there is no interspersing of the allowable locations of the second dots and the allowable locations of the third dots in the second stitched region along the first direction.

13. The method of claim 1, wherein the first direction is perpendicular to the scan direction.

14. The method of claim 1 further comprising advancing the recording medium along a medium advance direction by an advance distance relative to the printhead between printing the first dots and printing the second dots, wherein the first direction is parallel to the medium advance direction.

15. The method of claim 14, a nominal spacing between first dots in the first direction being d, wherein an ideal advance distance of D positions endmost first dots and adjacent endmost second dots to be spaced by d in the first direction, and wherein a nominal actual advance distance is less than D.

16. The method of claim 15, the nominal actual advance distance is greater than D−d.

17. The method of claim 1, wherein the printhead includes a first array of dot forming elements for printing the first swath and a second array of dot forming elements for printing the second swath, wherein the first array overlaps the second array along the first direction.

18. The method of claim 1, wherein the printhead includes M arrays of dot forming elements such that a first array is proximate to a first end of the printhead and an Mth array is proximate to a second end of the printhead, each of the arrays overlapping at least one adjacent array of the printhead, further comprising advancing the recording medium along a medium advance direction that is parallel to the first direction.

19. The method of claim 18 further comprising:
printing an Mth swath of Mth dots by printing an Mth series of print strokes by the Mth array, dots printed by each print stroke being disposed along the first direction and being spaced apart from dots printed by other print strokes of the Mth series along the scan direction, wherein the allowable dot locations of the Mth series have an irregular extent along at least an Mth stitch boundary of the Mth swath;
advancing the recording medium along a medium advance direction that is parallel to the first direction; and
printing an (M+1)th swath of (M+1)th dots by printing an (M+1)th series of print strokes by the first array, dots printed by each print stroke being disposed along the first direction and being spaced apart from dots printed by other print strokes of the (M+1)th series along the scan direction, an Mth stitch boundary of the (M+1)th swath being proximate to the Mth stitch boundary of the Mth swath to form an Mth stitched region, wherein the allowable dot locations of the (M+1)th series have an irregular extent along at least the Mth stitch boundary of the (M+1)th swath that is complementary to the irregular extent along the Mth stitch boundary of the Mth swath, wherein the allowable locations of the Mth dots and the allowable locations of the (M+1)th dots in the Mth stitched region are substantially not interspersed along the first direction.

20. The method according to claim 1 further comprising providing image data corresponding to an image to be printed, wherein the irregular extent of the allowable locations of the first dots is determined, at least in part, by the image data.

21. The method according to claim 1 further comprising printing at least one swath of dots between the steps of printing the first swath and printing the second swath.

22. An inkjet printing system comprising:
a printhead including at least one array of drop ejectors;
an ink source that is connected to the at least one array of drop ejectors;
a transport mechanism for moving the printhead relative to a recording medium along a scan direction;
an image data source to provide image data signals corresponding to an image to be printed;
an electrical pulse source for sending pulse waveforms to the printhead;
a controller for receiving the image data signals and sending output signals to the electrical pulse source for controlling the firing of the drop ejectors in order to print the image in a series of swaths; and
a set of print masks used by the controller for specifying at least which drop ejectors of a printhead are responsible for printing dots in each swath according to the image data in a stitched region having a height of K raster lines, the set of print masks including at least:
a first print mask including first stitch mask data arranged as K rows corresponding to the K raster lines for a first swath in the stitched region, and m columns corresponding to columns of dot locations along a first direction in the first swath, wherein for each column j from 1 to m, the first stitch mask data consists substantially of all ones from the first non-zero data element of the stitched region through row k(j) of the stitched region, and wherein the first stitch mask data consists substantially of all zeroes for row (k(j)+1) through row K; and
a second print mask including second stitch mask data arranged as K rows corresponding to the K raster lines for a second swath in the stitched region, and m columns corresponding to columns of dot locations along the first direction in the second swath, wherein the second stitch mask data is complementary to the first stitch mask data.

* * * * *